(12) United States Patent
Woo et al.

(10) Patent No.: US 10,509,575 B2
(45) Date of Patent: Dec. 17, 2019

(54) STORAGE DEVICE AND OPERATING METHOD OF STORAGE DEVICE

(71) Applicant: Samsung Electronics Co., Ltd., Suwon-si, Gyeonggi-do (KR)

(72) Inventors: Seonghoon Woo, Hwaseong-si (KR); Haksun Kim, Suwon-si (KR); Taemin Jeong, Seoul (KR); Kyuwook Han, Seoul (KR); Soon Suk Hwang, Ansan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 361 days.

(21) Appl. No.: 15/404,229

(22) Filed: Jan. 12, 2017

(65) Prior Publication Data

US 2017/0206030 A1    Jul. 20, 2017

(30) Foreign Application Priority Data

Jan. 14, 2016    (KR) .................. 10-2016-0004841

(51) Int. Cl.
*G06F 3/06*    (2006.01)
*G06F 12/14*    (2006.01)
*G06F 9/4401*    (2018.01)

(52) U.S. Cl.
CPC ............ *G06F 3/0623* (2013.01); *G06F 3/062* (2013.01); *G06F 3/064* (2013.01); *G06F 3/0655* (2013.01); *G06F 3/0679* (2013.01); *G06F 3/0688* (2013.01); *G06F 9/4418* (2013.01); *G06F 12/1408* (2013.01); *G06F 9/4401* (2013.01); *G06F 2212/1052* (2013.01); *G06F 2212/214* (2013.01); *G06F 2212/466* (2013.01); *G06F 2212/7203* (2013.01); *G06F 2212/7207* (2013.01)

(58) Field of Classification Search
CPC ...... G06F 3/0623; G06F 3/0688; G06F 3/064; G06F 3/062; G06F 3/0679; G06F 3/0655; G06F 12/1408; G06F 2212/1052
See application file for complete search history.

(56) References Cited

U.S. PATENT DOCUMENTS

| | | | |
|---|---|---|---|
| 7,679,133 B2 | 3/2010 | Son et al. | |
| 8,145,855 B2 | 3/2012 | Wan et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,726,128 B2 | 5/2014 | Doong | |
| 8,798,262 B1* | 8/2014 | Raizen | G06F 21/78 380/277 |
| 8,977,805 B2 | 3/2015 | Maislos et al. | |
| 9,037,782 B2* | 5/2015 | Seng | G06F 12/0246 711/103 |
| 9,104,588 B2 | 8/2015 | Mullarkey | |
| 9,152,578 B1* | 10/2015 | Saad | G06F 12/1408 |
| 9,195,537 B2* | 11/2015 | Sharon | G06F 11/1048 |
| 9,323,876 B1* | 4/2016 | Lysaght | G06F 17/5054 |

(Continued)

*Primary Examiner* — Nelson S. Giddins
(74) *Attorney, Agent, or Firm* — Harness, Dickey and Pierce, P.L.C.

(57) ABSTRACT

A storage device includes a nonvolatile memory device, and a controller configured to control the nonvolatile memory device based on metadata. The controller encrypts the metadata and loads the encrypted metadata on a random access memory of an external host device.

20 Claims, 25 Drawing Sheets

(56) References Cited

U.S. PATENT DOCUMENTS

| | | | |
|---|---|---|---|
| 9,749,319 B2* | 8/2017 | Serebrin | G06F 12/1475 |
| 10,027,666 B2* | 7/2018 | Serebrin | G06F 12/1475 |
| 2003/0131250 A1* | 7/2003 | Quere | G06F 21/72 |
| | | | 713/189 |
| 2004/0123109 A1* | 6/2004 | Choi | H04L 9/3239 |
| | | | 713/176 |
| 2006/0015753 A1* | 1/2006 | Drehmel | G06F 21/72 |
| | | | 713/193 |
| 2009/0006796 A1* | 1/2009 | Chang | G06F 21/79 |
| | | | 711/163 |
| 2009/0144563 A1* | 6/2009 | Souza | G06F 21/54 |
| | | | 713/193 |
| 2010/0241815 A1* | 9/2010 | McManis | G06F 3/0611 |
| | | | 711/154 |
| 2010/0287328 A1* | 11/2010 | Feldman | G06F 12/0246 |
| | | | 711/103 |
| 2010/0332723 A1* | 12/2010 | Lin | G06F 21/10 |
| | | | 711/100 |
| 2011/0008021 A1* | 1/2011 | Casper | G11B 27/034 |
| | | | 386/326 |
| 2011/0233648 A1 | 9/2011 | Seol et al. | |
| 2012/0030408 A1* | 2/2012 | Flynn | G06F 12/0246 |
| | | | 711/102 |
| 2012/0054582 A1* | 3/2012 | Byom | G06F 11/1072 |
| | | | 714/773 |
| 2012/0096281 A1* | 4/2012 | Eszenyi | G06F 21/602 |
| | | | 713/189 |
| 2012/0159040 A1* | 6/2012 | Parikh | G06F 13/1694 |
| | | | 711/103 |
| 2012/0239860 A1* | 9/2012 | Atkisson | G06F 12/0246 |
| | | | 711/103 |
| 2012/0310983 A1* | 12/2012 | Mittal | G06F 21/44 |
| | | | 707/785 |
| 2013/0262880 A1 | 10/2013 | Pong et al. | |
| 2013/0326117 A1* | 12/2013 | Aune | G06F 3/0608 |
| | | | 711/103 |
| 2014/0115234 A1* | 4/2014 | Woo | G06F 12/0246 |
| | | | 711/103 |
| 2014/0237307 A1 | 8/2014 | Kobla et al. | |
| 2014/0365785 A1* | 12/2014 | Deforest | G06F 12/1408 |
| | | | 713/193 |
| 2015/0052329 A1* | 2/2015 | Fujinami | G06F 12/1027 |
| | | | 711/207 |
| 2015/0074426 A1* | 3/2015 | Jean | G06F 12/1408 |
| | | | 713/193 |
| 2015/0154121 A1* | 6/2015 | Schmier | G06F 12/1408 |
| | | | 713/193 |
| 2015/0161059 A1 | 6/2015 | Durham et al. | |
| 2015/0205731 A1 | 7/2015 | Dell et al. | |
| 2016/0026406 A1* | 1/2016 | Hahn | G06F 3/0631 |
| | | | 711/103 |
| 2016/0026667 A1* | 1/2016 | Mukherjee | G06F 16/2282 |
| | | | 707/714 |
| 2016/0078245 A1* | 3/2016 | Amarendran | G06F 16/164 |
| | | | 713/193 |
| 2016/0232103 A1* | 8/2016 | Schmisseur | G06F 13/16 |
| 2016/0344731 A1* | 11/2016 | Serebrin | G06F 12/1475 |
| 2017/0024568 A1* | 1/2017 | Pappachan | G06F 13/28 |
| 2017/0185529 A1* | 6/2017 | Chhabra | G06F 3/0685 |
| 2018/0101484 A1* | 4/2018 | Durham | G06F 21/72 |
| 2018/0365438 A1* | 12/2018 | Bhattacharyya | G06F 21/64 |
| 2019/0012484 A1* | 1/2019 | Gulati | G06F 12/0246 |

* cited by examiner

FIG. 7

| SEED | Variability |
|---|---|
| RN | Varies when power on |
| Address | Varies when remapped address is used |
| 2nd Signature | Varies when one of signature, address or RN varies |

FIG. 13

| Scheme | SEED |
|---|---|
| S1 | (Remapped)Address and RN |
| S2 | (Remapped)Address |
| S3 | Signature and RN |
| S4 | Signature |
| S5 | (Remapped)Address, signature and RN |
| S6 | (Remapped)Address and signature |

FIG. 24
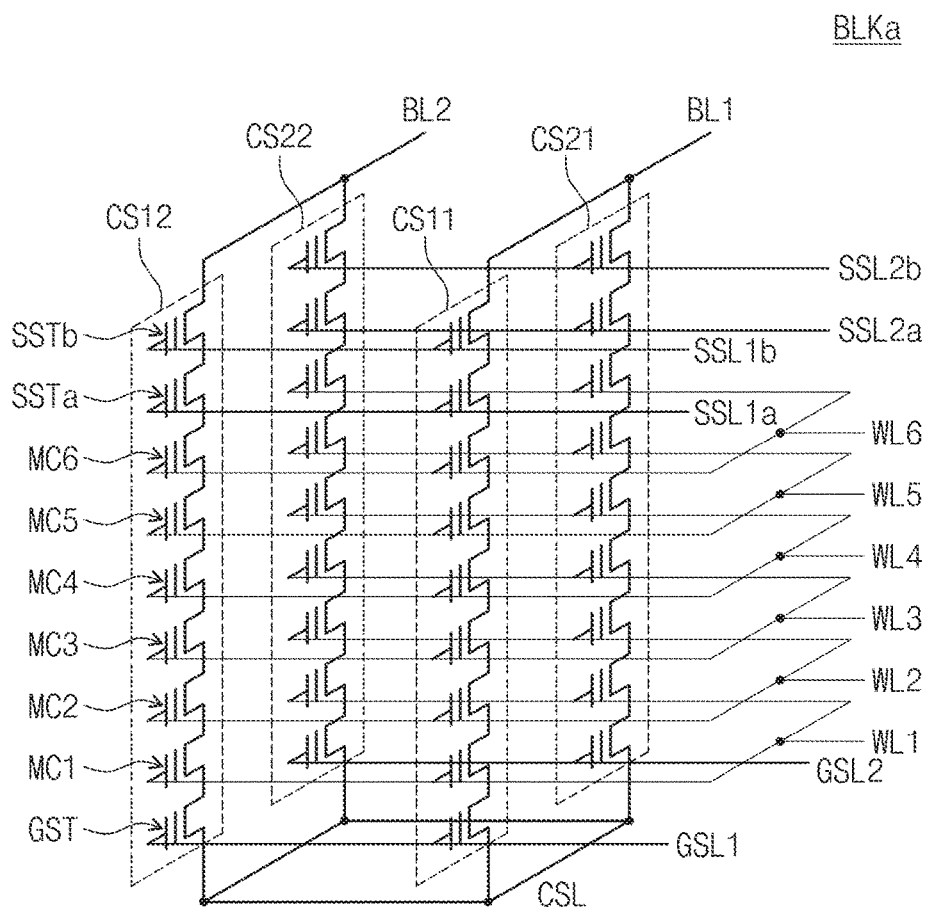
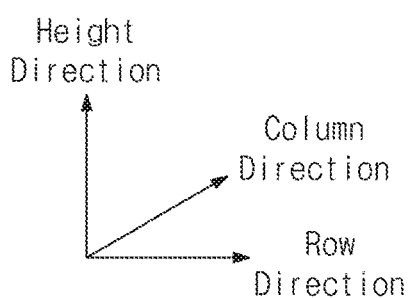

STORAGE DEVICE AND OPERATING METHOD OF STORAGE DEVICE

CROSS-REFERENCE TO RELATED APPLICATIONS

A claim for priority under 35 U.S.C. § 119 is made to Korean Patent Application No. 10-2016-0004841 filed Jan. 14, 2016, in the Korean Intellectual Property Office, the entire contents of which are hereby incorporated by reference.

BACKGROUND

One or more example embodiments relate to a semiconductor memory. For example, at least some example embodiments relate to a storage device and/or an operating method thereof.

The storage device may be a device that stores data under control of a host device such as a computer, a smart phone, or a smart pad. The storage device includes a device, which stores data on a magnetic disk (e.g., a hard disk drive (HDD)), or a device that stores data on a semiconductor memory, in particular, a nonvolatile memory, such as a solid state drive (SSD) or a memory card.

The nonvolatile memory may include a read only memory (ROM), programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), or a ferroelectric RAM (FRAM).

The storage device may manage metadata for controlling the nonvolatile memory device. The metadata may include information on a method or a rule for controlling the nonvolatile memory device. In the case where a hacking device hacks into the metadata of the storage device, the security of the storage device may be compromised. Accordingly, there may be a need for a device and/or a method for improving the security of the metadata of the storage device.

SUMMARY

One or more example embodiments include a storage device with improved security and/or an operating method thereof.

Additional aspects will be set forth in part in the description which follows and, in part, will be apparent from the description, or may be learned by practice of the presented example embodiments.

One or more example embodiments relate to a storage device including a nonvolatile memory device; and a controller configured to, control the nonvolatile memory device based on metadata, encrypt the metadata to generate encrypted metadata, and load the encrypted metadata on a random access memory of an external host device.

One or more example embodiments relate to a storage device including a nonvolatile memory device including a plurality of cell strings, the plurality of cell strings including a plurality of memory cells stacked in a direction perpendicular to a substrate; and a controller configured to, control the nonvolatile memory device based on metadata, read the metadata from the nonvolatile memory device, encrypt the metadata to generate encrypted metadata, and load the encrypted metadata on a random access memory of an external host device.

One or more example embodiments relate to a method of operating a storage device configured to communicate with an external host device, the external host device including a random access memory, the method including encrypting, by the storage device, metadata to generate encrypted metadata; loading, by the storage device, the encrypted metadata on the random access memory; and performing, by the storage device, one of a write, read, and erase operation based on the encrypted metadata that is loaded on the random access memory.

One or more example embodiments relate to a storage device including a memory and a processor, the memory containing computer readable code that, when executed by the processor, configures the processor to perform an operation on data associated with storage device by, reading encrypted metadata from a host buffer memory area (HBMA) of a host device, decrypting the encrypted metadata to generate decrypted metadata, mapping logical addresses received from the host device to physical addresses of the storage device based on the decrypted metadata, and performing the operation on the data based on the physical addresses.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 7 is a table illustrating seeds that vary in performing encryption by using the encryption circuit of FIG. 4;

FIG. 13 is a table illustrating an example of seeds used in the first scramble unit or the scramble unit of each of the encryption circuits of FIGS. 10 to 12;

FIG. 24 is a circuit diagram illustrating a memory block according to an example embodiment of the inventive concepts.

DETAILED DESCRIPTION

Below, example embodiments of the inventive concepts will described in detail with reference to the attached drawings to the extent that the example embodiments of the inventive concepts are easily implemented by a person of ordinary skill in the art to which the example embodiments of inventive concepts belong.

Figure 1:
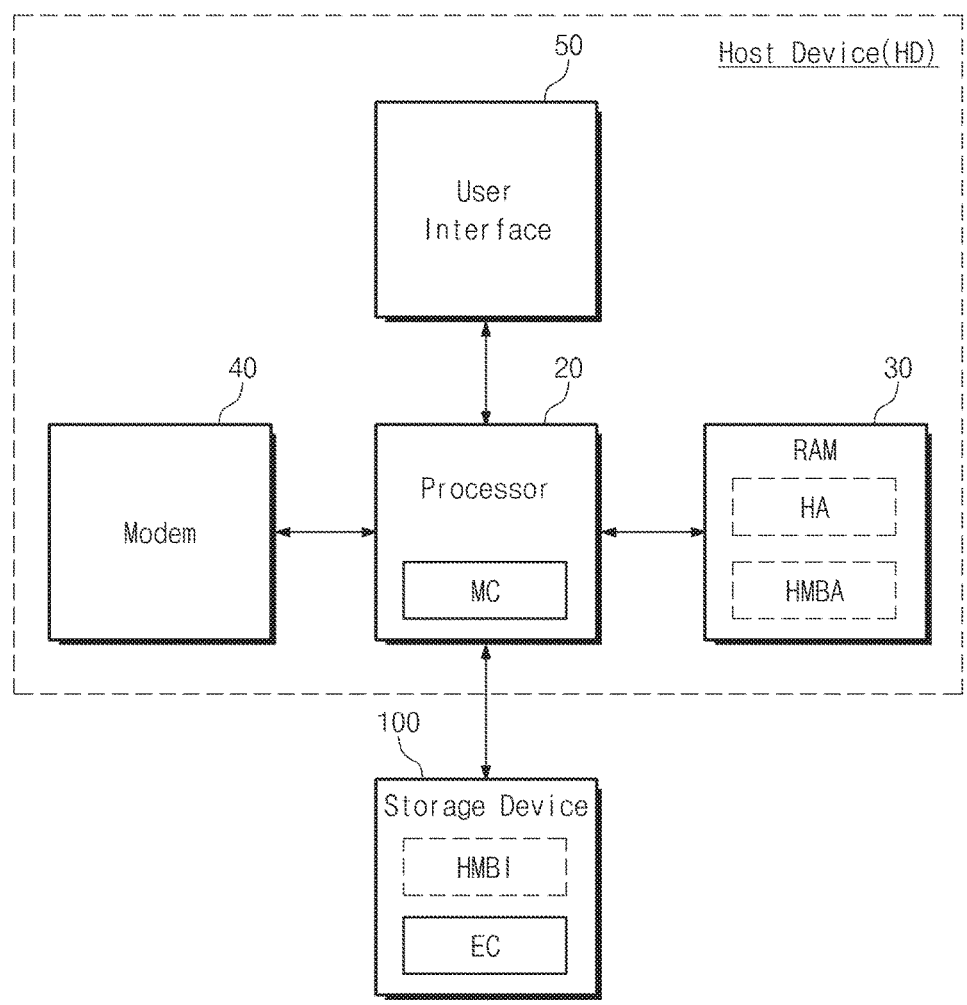
FIG. 1 is a block diagram illustrating a computing device according to an example embodiment of the inventive concepts.

FIG. 1 is a block diagram illustrating a computing device 10 according to an example embodiment of the inventive concepts.

Referring to FIG. 1, the computing device 10 may include a processor 20, a random access memory (RAM) 30, a modem 40, a user interface 50, and a storage device 100.

The processor 20 may control an overall operation of the computing device 10 and may perform logical operations.

The processor 20 may be a hardware-based data processing device that includes a circuit physically configured to execute operations expressed by commands included in code or a program. For example, the processor 20 may be a system-on-chip (SoC). The processor 20 may be a general purpose processor, a specific-purpose processor, or an application processor.

For example, the processor 20 may be configured to execute instructions stored in a memory, that when executed, configure the processor 20 as a special purpose processor to control the computing device 10.

The processor 20 may communicate with the RAM 30. The RAM 30 may be a main memory of the processor 20 or the computing device 10. The processor 20 may store code or data at the RAM 30 temporarily. The processor ay execute the code by using the RAM 30 and may process data. The processor 20 may execute a variety of software, such as an operating system and an application, by using the RAM 30. The processor may control an overall operation of the computing device 10 by using the RAM 30.

The RAM 30 may include a volatile memory such as a static RAM (SRAM), a dynamic RAM (DRAM), or a synchronous DRAM (SDRAM) or a nonvolatile memory such as a phase-change RAM (PRAM), a magnetic RAM (MRAM), a resistive RAM (RRAM), or a ferroelectric RAM (FRAM).

The modem 40 may communicate with an external device under control of the processor 20. For example, the modem 40 may communicate with the external device in a wired and/or wireless manner. The modem 1400 may communicate with the external device, based on at least one of wireless communications manners such as long term evolution (LTE), WiMax, global system for mobile communication (GSM), code division multiple access (CDMA), Bluetooth, near field communication (NFC), Wi-Fi, and radio frequency identification (RFID) or wired communications manners such as universal serial bus (USB), SATA, HSIC, SCSI, Firewire, peripheral component interconnection (PCI), PCI express (PCIe), nonvolatile memory express (NVMe), universal flash storage (UFS), secure digital (SD), SDIO, universal asynchronous receiver transmitter (UART), serial peripheral interface (SPI), high speed SPI (HS-SPI) RS232, inter-integrated circuit (I2C), HS-I2C, integrated-interchip sound (I2S), Sony/Philips digital interface (S/PDIF), multimedia card (MMC), and embedded MMC (eMMC).

The user interface 50 may communicate with a user under control of the processor 20. For example, the user interface 50 may include user input interfaces such as a keyboard, a keypad, buttons, a touch panel, a touch screen, a touch pad, a touch ball, a camera, a microphone, a gyroscope sensor, and/or a vibration sensor. The user interface 50 may further include user output interfaces such as a liquid crystal display (LCD), an organic light-emitting diode (OLED) display device, an active matrix OLED (AMOLED) display device, a light-emitting diode (LED), a speaker, and a motor.

In an example embodiment, the processor 20, the RAM 30, the modem 40, and the user interface 50 may constitute a host device that communicates with the storage device 100.

The storage device 100 may communicate with the processor 20. The storage device 100 may be used to store data. That is, the processor 110 may store data in the storage device 100. The storage device 100 may store a boot image for driving the computing device 10. The storage device 100 may store source code of a variety of software, such as an operating system and an application. The storage device 100 may store data that is processed by a variety of software, such as an operating system and an application.

In an example embodiment, the processor 20 may drive a variety of software, such as operating system and an application, by loading source code stored in the storage device 100 on the RAM 30 and executing the code. The processor 20 may load data stored in the storage device 100 on the RAM 30 and may process data loaded on the RAM 30. The processor 20 may store long-term data among data, which are stored in the RAM 30, in the storage device 100.

The storage device 100 may include a nonvolatile memory such as a flash memory, a PRAM, an MRAM, an RRAM, or an FRAM.

In an example embodiment, the modem 40, the user interface 50, and the storage device 100 may be configured to communicate with the processor 20 through an internal bus. For example, the internal bus may include a PCIe bus or an NVMe bus.

The storage device 100 may refer to metadata when performing a write, read, or erase operation in response to control of the host device HD or when performing background operation based on an internal schedule. For example, the metadata may include data that indicates a mapping relation between logical addresses, which the host device HD assigns to the storage device 100, and physical addresses of the storage device 100. For example, the storage device 100 may convert a logical address provided from the host device HD into a physical address and may perform a write, read, erase, or a background operation based on the physical address.

The storage device 100 may be configured to load the metadata on the RAM 30 of the storage device HD. For example, the storage device 100 may store host memory buffer information (HMBI). The host memory buffer information HMBI may include information indicating whether the storage device 100 supports the load of the metadata on the host device 10, information on a capacity of the RAM 300 necessary for the storage device 100 to store the metadata, and the like.

In the case where the storage device 100 and the host device HD support the load of the metadata on the RAM 30, the host device HD may allocate a part of a space of the RAM 30 to the storage device 100. For example, a host area HA of the RAM 30 may be used by the host device HD. A host memory buffer area HMBA of the RAM 300 may be used by the storage device 100.

The processor 20 may include a memory controller MC that is configured to control the RAM 300. The processor 20 may use the host area HA of the RAM 300 through the memory controller MC. The storage device 100 may communicate with the memory controller MC without intervention of the processor 20 and may use the host memory buffer area HMBA of the RAM 30 through the memory controller MC.

In an example embodiment, the processor 20 may execute instructions that configure the processor 20 as the memory controller MC. In another example embodiment, the memory controller MC may be implemented with a separate package outside the processor 20, not inside the processor 20.

In the case where the storage device 100 loads the metadata on the RAM 30, the metadata may be vulnerable to hacking. For example, the metadata of the storage device 100 may be leaked out by hacking into communication between the storage device 100 and the host device HD when the storage device 100 loads the metadata on the RAM 30. For example, the metadata of the storage device 100 may be leaked out by hacking into the host memory buffer area HMBA of the RAM 30 when the storage device 100 loads the metadata on the RAM 30.

When the metadata of the storage device 100 is leaked out, policies in which the storage device 100 performs erase, write, and read operations in response to requests of the host device HD and performs a background operation may be leaked out. As such, the security of the storage device 100 may be compromised. This may mean that the probability to hack into the storage device may become higher.

To prevent the above-described issue, the storage device 100 according to an example embodiment may include an encryption circuit EC. The storage device 100 may be configured to encrypt the metadata by using the encryption circuit EC and to load the encrypted metadata on the host buffer memory area HMBA of the RAM 300 in the host device HD. The storage device 100 may be configured to obtain the metadata by reading the encrypted metadata from the host memory buffer area HMBA and decrypting the read encrypted metadata by using the encryption circuit EC. Since the encrypted metadata is managed at the outside of the storage device 100 and original metadata is not managed outside the storage device 100, the security of the metadata of the storage device 100 may be improved. This may mean that the security of the storage device 100 and the computing device 10 is improved.

Figure 2:
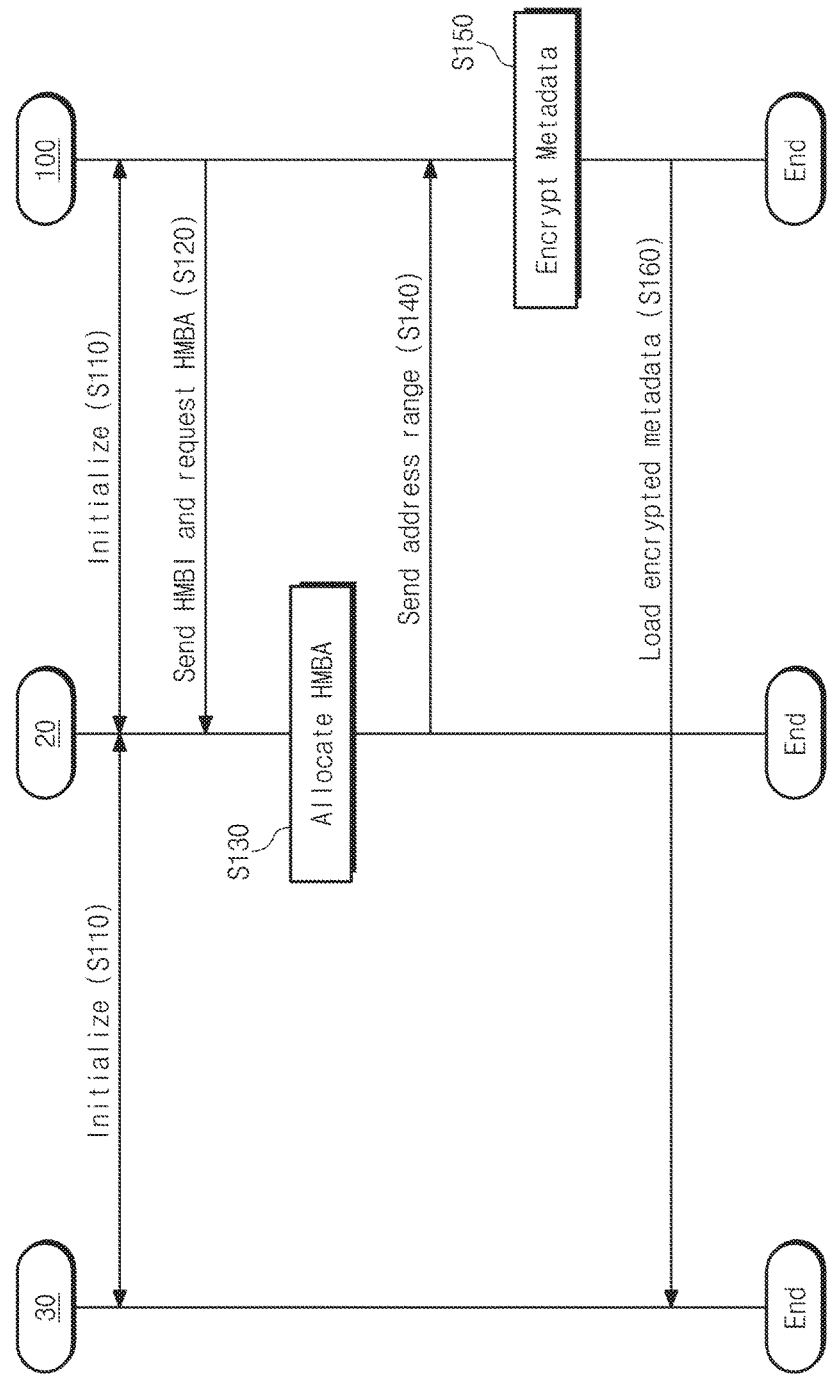
FIG. 2 is a flowchart illustrating an operating method of the computing device 10 according to an example embodiment of the inventive concepts.

FIG. 2 is a flowchart illustrating an operating method of the computing device 10 according to an example embodiment of the inventive concepts. For descriptive convenience, operations of the processor 20, the RAM 30, and the storage device 100 are illustrated in FIG. 2.

Referring to FIGS. 1 and 2, in operation S110, the processor 20, the RAM 30, and the storage device 100 may be initialized.

In operation S120, the storage device 100 may send the host memory buffer information HMBI to the processor 20 and may request the processor 20 to allocate the host buffer memory area HMBA.

In operation S130, the processor 20 may allocate a part of a memory area of the RAM 30 as the host memory buffer area HMBA based on the host memory buffer information HMBI.

In operation S140, the processor 20 may send an address range of the host memory buffer area HMBA to the storage device 100. For example, the processor 20 may send start and end addresses of the host memory buffer area HMBA to the storage device 100. In the case where the host memory buffer area HMBA is formed of a plurality of chunks that are discontinuous, the processor 20 may send start and end addresses of each of the plurality of chunks of the host memory buffer area HMBA to the storage device 100.

In operation S150, the storage device 100 may encrypt the metadata. For example, the storage device 100 may read the metadata from a nonvolatile memory device therein and may encrypt the read metadata.

In operation S160, the storage device 100 may load the encrypted metadata on the RAM 30.

Operations S110 to S160 may be sequentially performed after the computing device 10 is powered, after the computing device 10 is reset, and/or when the computing device 10 exits from a power-saving mode. For example, in the case where the storage device 100 and the host device HD support a host memory buffer that the storage device 100 encrypts the metadata and loads the encrypted metadata on the RAM 30 may be understood as being included in an initialization procedure of the computing device 10.

After the encrypted metadata is loaded on the RAM 30 of the host device HD, the storage device 100 may perform a write, read, erase, or background operation in real time based on the metadata stored in the RAM 30.

In the example embodiment illustrated in FIG. 2, the storage device 100 sends the host memory buffer information HMBI to the processor 20 and requests the processor 20 to allocate the host buffer memory area HMBA. However, example embodiments may not be limited thereto.

For example, in some example embodiments, the processor 20 may receive the host memory buffer information HMBI from the storage device 100 during an initialization operation (e.g., training) with the storage device 100. The processor 20 may determine whether to allocate the host memory buffer area HMBA and may send the determination result to the storage device 100. That is, the host memory buffer area HMBA may be allocated by the determination of the processor 20, not by a request of the storage device 100.

In another example embodiment, the host memory buffer area HMBA may be allocated according to a procedure that is defined by the standard of the non-volatile memory express (NVMe). Allocation of the host memory buffer area HMBA according to the NVMe standard may include a next version of the NVMe standard as well as a current version of the NVMe standard, which are incorporated herein by references.

Figure 3:
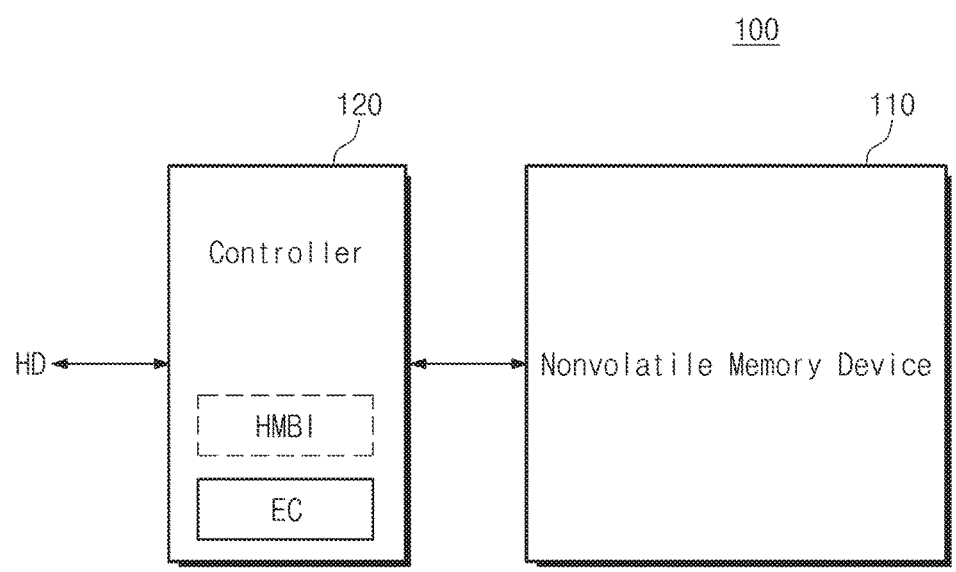
FIG. 3 is a block diagram illustrating the storage device according to an example embodiment of the inventive concepts.

FIG. 3 is a block diagram illustrating the storage device 100 according to an example embodiment of the inventive concepts.

Referring to FIGS. 1 and 3, the storage device 100 may include a nonvolatile memory device 110 and a controller 120.

The controller 120 may control write, read, and erase operations of the nonvolatile memory device 110 in response to control of the host device HD. The controller 120 may control the write, read, and erase operations of the nonvolatile memory device 110 based on an internal schedule associated with the background operation.

The controller 120 may be implemented by at least one semiconductor chip disposed on a printed circuit board. The semiconductor chip may be an arithmetic logic unit, a digital signal processor, a microcomputer, a field programmable array, a programmable logic unit, a microprocessor or any other device capable of responding to and executing instructions in a defined manner.

For example, the controller 120 may execute instructions that configure the controller as a special purpose processor to read encrypted metadata from a host buffer memory area (HBMA) of a host device, decrypt the encrypted metadata to generate decrypted metadata, map logical addresses received from the host device to physical addresses of the storage device based on the decrypted metadata, and perform the operation on the data based on the physical addresses.

The controller 120 may include the encryption circuit EC and may be configured to store the host memory buffer information HMBI. For example, the host memory buffer information HMBI may be stored in an internal nonvolatile storage of the controller 120. For example, the nonvolatile storage may include a read only memory (ROM), a laser fuse, an electrical fuse, a nonvolatile memory cell, and the like. As another example, the host memory buffer information HMBI may be stored in the nonvolatile memory device 110 and may be read by the controller 120 from the nonvolatile memory device 110 when the storage device 100 is powered on.

The controller 120 may be configured to refer to encrypted metadata of the RAM 30 in the host device HD in real time when a write, read, or erase operation is performed according to a request from the host device HD or when a write, read, or erase operation is performed according to an internal schedule associated with an internal operation a background operation). For example, when reading encrypted metadata, the controller 120 may decrypt the encrypted metadata by using the encryption circuit EC and may perform the write, read, or erase operation based on the decrypted metadata. Furthermore, when updating the encrypted metadata, the controller 120 may encrypt the updated metadata and may load the encrypted metadata on the RAM 30 of the host device HD.

For example, the encryption circuit EC may be configured to perform encryption and decryption based on an advanced encryption standard (AES). As another example, to prevent operating speeds of the storage device 100 and the computing device 10 from decreasing due to the AES, the encryption circuit EC according to an example embodiment may be configured to provide an encryption and decryption method having an encryption or decryption time shorter than that of the AES and removes association between original data and encrypted data so as to have a level similar with that of the AES.

Figure 4:
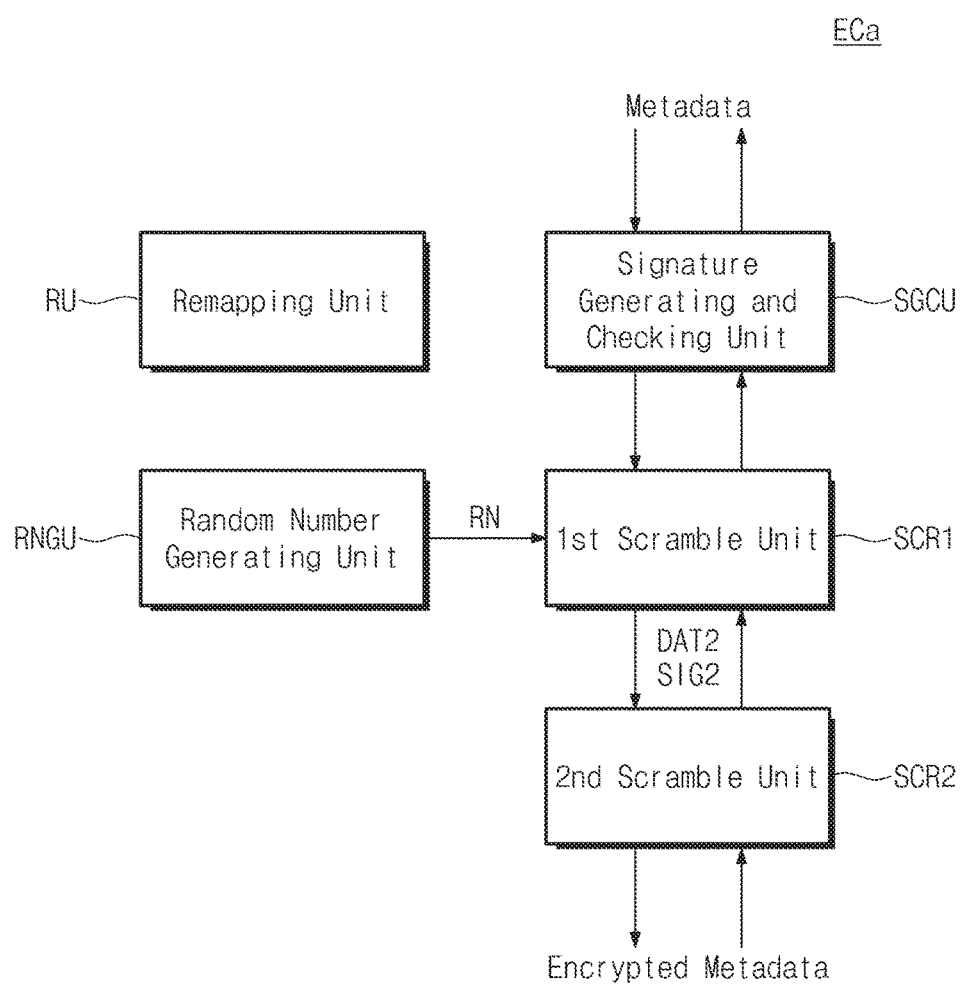
FIG. 4 is a block diagram illustrating an encryption circuit according to an example embodiment of the inventive concepts.

FIG. 4 is a block diagram illustrating an encryption circuit ECa according to an example embodiment of the inventive concepts.

Referring to FIGS. 1, 3, and 4, the encryption circuit ECa may include a remapping unit RU, a signature generating and checking unit SGCU, a first scramble unit SCR1, a second scramble unit SCR2, and a random number generating unit RNGU.

The remapping unit RU, the signature generating and checking unit SGCU, the first scramble unit SCR1, the second scramble unit SCR2, or the random number generating unit RNGU may be implemented with a hardware circuit or a device or by firmware or software that is driven on a device or a hardware circuit.

For example, the controller 120 may execute instructions that configure the controller 120 to perform the functions of the remapping unit RU, the signature generating and checking unit SGCU, the first scramble unit SCR1, the second scramble unit SCR2, and the random number generating unit RNGU.

The remapping unit RU may be configured to convert an address of the host memory buffer area HMBA that the controller 120 generates. For example, during initialization of the computing device 10, the controller 120 may request a memory area corresponding to a first address range as the host memory buffer area HMBA. The controller 120 may select an address within a second address range when storing the encrypted metadata in the host memory buffer area HMBA. The second address range may be less than the first address range. The remapping unit RU may remap the second address within the second address range, which the controller 120 selects, to the first address within the first address range. For example, the remapping unit RU may change snapping of the first address and the second address when storing the encrypted metadata in the host memory buffer area HMBA or updating it. The remapping unit RU may maintain remapping of the first address and the second address when reading the encrypted metadata from the host memory buffer area HBMA.

The signature generating and checking unit SGCU may be configured to generate a signature from metadata to be encrypted upon encryption of the metadata. The signature may be sent to the first scramble unit SCR1 together with the metadata for encryption.

The signature generating and checking unit SGCU may be configured to generate the signature from decrypted metadata upon decryption of the metadata. The signature generating and checking unit SGCU may be configured to determine whether the metadata is changed (or modified or hacked), by comparing the decrypted signature and the generated signature. For example, in the case where the decrypted signature is the same as the generated signature, the signature generating and checking unit SGCU may determine the metadata, which is read from the RAM 30 and is decrypted, as being not changed (or modified or hacked). The controller 120 may access the nonvolatile memory device 110 based on the decrypted metadata. In the case where the decrypted signature is different from the generated signature, the signature generating and checking unit SGCU may determine the metadata, which is read from the RAM 30 and is decrypted, as being changed (or modified or hacked). The controller 120 may request the host device HI) to resend the modulated metadata or to discard the modulated metadata.

In an example embodiment, the signature generating and checking unit SGCU may generate a cyclic redundancy check (CRC) parity from the metadata to be encrypted or the decrypted metadata and may use the CRC parity as the signature. However, example embodiments of the inventive concepts may not be limited thereto. For example, the signature generating and checking unit SGCU may be modified or changed to generate the signature by using at leak one of various algorithms, which are used to generate additional data from original data, such as a hash function or error correction encoding.

The random number generating unit RNGU may be configured to generate a random number RN. For example, the random number generating unit RNGU may generate a true random number or a pseudo random number. For example, the random number generating unit RNGU may be configured to generate the random number RN when the computing device 10 is powered on, after the computing device 10 is completely reset, and/or when the computing device 10 exits from the power saving mode. The random number RN thus generated may be sent to the first scramble unit SCR1.

The first scramble unit SCR1 may receive the metadata and the signature from the signature generating and checking unit SGCU upon encryption of the metadata. Furthermore, the first scramble unit SCR1 may receive the random number RN from the random number generating unit RNGU. The first scramble unit SCR1 may scramble the metadata and the signature based on (or using) the received random number RN.

For example, the first scramble unit SCR1 may generate a seed by combining the random number RN with an address the first address in the first address range or the second address in the second address range) of the host memory buffer area. HMBA of the RAM 30, that is, an access target. For example, the first scramble unit SCR1 may generate the seed by combining the random number RN with the address before or after remapping of the remapping unit RU. The first scramble unit SCR1 may scramble the metadata and the signature based on (or using) the generated seed. For example, the first scramble unit SCR1 may perform an XOR operation on each bit of the metadata and the signature with circularly shifting each bit of the seed. For example, the first scramble unit SCR1 may scramble the metadata and the signature as one data. For example, each bit of a sequence including the metadata and the signature may be scrambled with circularly shifting each bit of the seed (or circularly shifting each bit of a sequence generated based on the seed). As another example, the first scramble unit SCR1 may determine the metadata and the signature as different data and may scramble the metadata and the signature based on the seed, respectively. For example, each bit of the metadata may be scrambled with circularly shifting each bit of the seed (or circularly shifting each bit of a sequence generated based on the seed), and then each but of the signature may be scrambled with circularly shifting each bit of the seed (or circularly shifting each bit of a sequence generated based on the seed). The scrambled metadata may be sent to the second scramble unit SCR2 as second data DAT2. The scrambled signature may be sent to the second scramble unit SCR2 as a second signature SIG2.

The first scramble unit SCR1 may receive the second data DAT2 and the second signature SIG2 from the second scramble unit SCR2 upon decryption of the metadata. Furthermore, the first scramble unit SCR1 may receive the random number RN from the random number generating unit RNGU. The first scramble unit SCR1 may perform descramble with respect to the second data DAT2 and the second signature SIG2 based on (or using) the received random number RN. For example, the first scramble unit SCR1 may combine the random number RN and the address and may select the combined result as a seed. The first scramble unit SCR1 may descramble the second data DAT2 and the second signature SIG2 based on (or using) the seed. For example, the first scramble unit SCR1 may perform an XOR operation on each bit of the metadata and the signature with circularly shifting each bit of the seed (or circularly shifting each bit of a sequence generated based on the seed). The second data DAT2 descrambled through the descramble may be sent to the signature generating and checking unit SGCU as decrypted metadata. The second signature SIG2 thus descrambled may be sent to the signature generating and checking unit SGCU as a decrypted signature.

The second scramble unit SCR2 may receive the second data SCR2 and the second signature DAT2 from the first scramble unit SIG2 upon encryption of the metadata. The second scramble unit SCR2 may scramble the second data DAT2 by using the second signature SIG2 as the seed. The scrambled second data DAT2 and the second signature SIG2 may be loaded on the host memory buffer area HMBA of the RAM 30 as encrypted metadata.

The second scramble unit SCR2 may receive the encrypted metadata from the host memory buffer area HMBA of the RAM 30 upon decryption of the metadata. The encrypted metadata may include the scrambled second data and the second signature. The second scramble unit SCR2 may descramble the scrambled second data by using second signature SIG2 as the seed. The descrambled second data DAT2 and the second signature may be sent to the first scramble unit SCR1.

Figure 5:
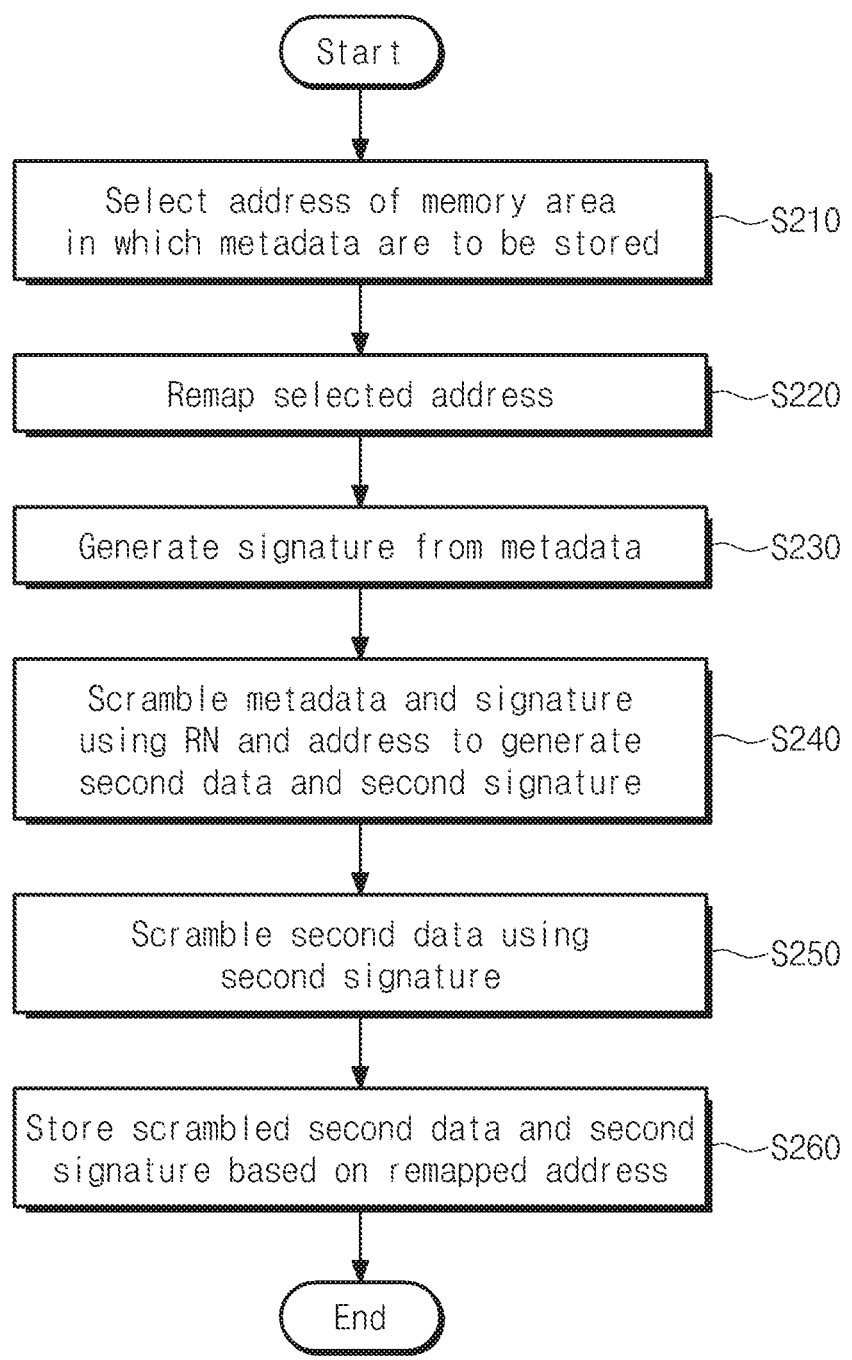
FIG. 5 is a flowchart illustrating a method in which the storage device 100 according to an example embodiment stores metadata in the host memory buffer area of the RAM by using the encryption circuit of FIG. 4.

FIG. 5 is a flowchart illustrating a method in which the storage device 100 according to an example embodiment stores metadata in the host memory buffer area HMBA of the RAM 30 by using the encryption circuit ECa of FIG. 4.

Referring to FIGS. 1, 3, 4, and 5, in operation S210, the controller 120 may select an address of a memory area or block in which metadata is to be stored. For example, the controller 120 may select an address the second address) of a memory area or block in which metadata is to be stored, within an address range (e.g., the second address range) of the host memory buffer area HMBA. For example, a core circuit (refer to FIG. 22) of the controller 120 may select an address within the second address range.

In operation S220, the controller 120 (e.g., the remapping unit RU within the controller 120) may remap the selected address. For example, the remapping unit RU may convert the second address selected within the second address range into the first address within the first range. The first address range may be larger than the second address range. For example, the remapping unit RU may ignore the first address previously mapped to the second address and may remap a new first address.

In an example embodiment, the controller 120 may partition a storage space of the second address range into a plurality of second storage areas for management. The remapping unit RU may partition a storage space of the first address range into a plurality of first storage areas for management. A size of each of the plurality of second storage areas may be the same as that of each of the plurality of first storage areas.

The controller 120 may update (or newly write) metadata of one selected from the plurality of second storage areas. When the metadata of the second storage area thus selected is updated (or newly written), the remapping unit RU may associate the selected second storage area with the new first storage area.

For example, the remapping unit RU may convert the second address of the second address range into the first address of the first address range, based on a table, a pattern, or a function. For example, the first address of the first address range may have the same format as the second address of the second address range and may comply with the same address system. As another example, the first address of the first address range may have a format different from that of the second address of the second address range and may be an internal address or virtual address complying with a different address system.

In operation S230, the controller 120 (e.g., the signature generating and checking unit SGCU within the controller 120) may generate a signature from the metadata. For example, the signature generating and checking unit SGCU may generate a CRC parity from the metadata and may use the CRC parity as the signature.

In operation S240, the controller 120 (e.g., the first scramble unit SCR1 within the controller 120) may generate the second data DAT2 and the second signature SIG2 by scrambling the metadata and the signature on the basis of the random number RN and the address. For example, the random number RN may be a true random number or a pseudo random number. For example, the first scramble unit SCR1 may perform scramble based on an address selected within the second address range before remapping or an address selected within the first address range after remapping.

In operation S250, the controller 120 the second scramble unit SCR2 within the controller 120) may scramble the second data DAT2 based on the second signature SIG2.

In operation S260, the controller 120 may store the scrambled second data and the second signature SIG2 as encrypted metadata in the host memory buffer area HMBA of the RAM 30 in the host device HD based on the remapped address.

Figure 6:
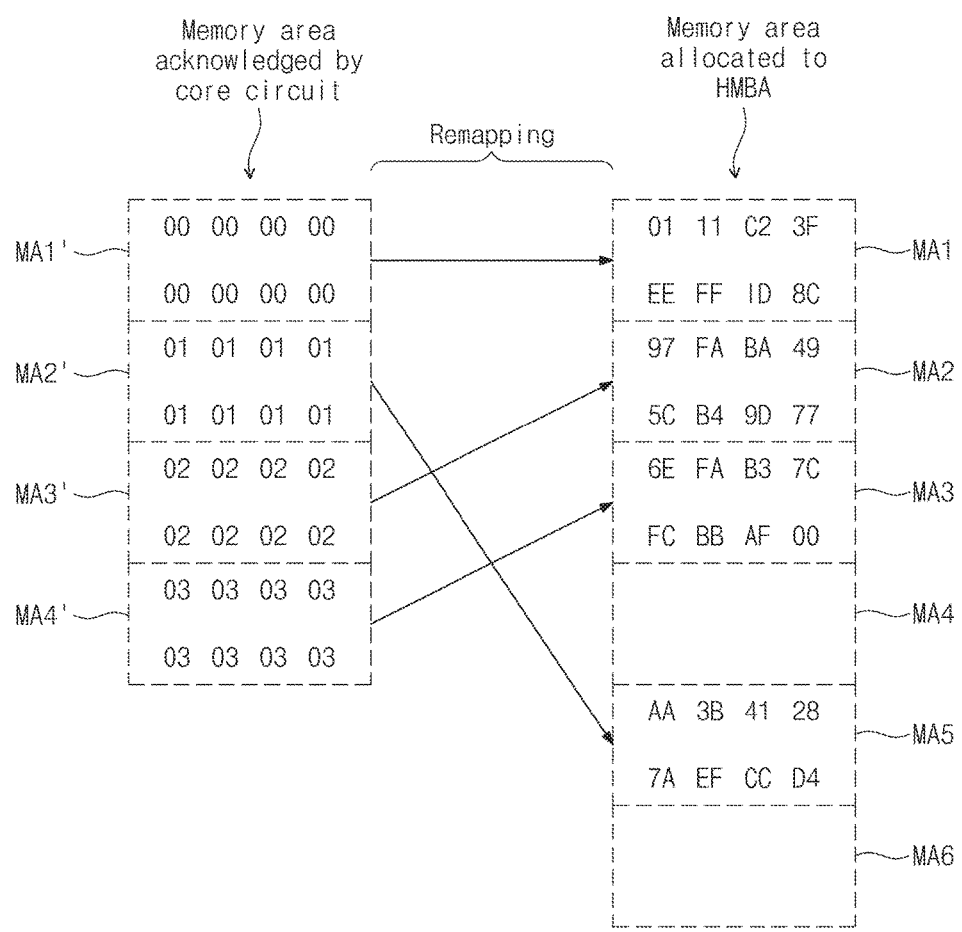
FIG. 6 is a drawing illustrating an example in which the controller stores metadata in the RAM.

FIG. 6 is a drawing illustrating an example in which the controller 120 stores metadata in the RAM 30.

Referring to FIGS. 1 and 3 to 6, the first address range that is allocated by the processor 20 to the host memory buffer area HMBA may correspond to first to sixth storage areas MA1 to MA6. The second address range of the host memory buffer area HMBA that is distinguished by core circuit (refer to FIG. 22) of the controller 120 may correspond to first to fourth storage areas MA1' to MA4' or blocks.

In the first to fourth storage areas MA1' to MA4' of the second address range, the core circuit of the controller 120 may write the same metadata at the same locations or may update data at the same locations with the same metadata. For example, mapping information between a logical address and a physical address associated with an m-th physical address range (e.g., a physical address range of a first memory block in FIG. 23) of the nonvolatile memory device 110 may be stored or updated in an n-th storage area MAn'. Here, "m" and "n" may be a positive integer. As another example, mapping information between a physical address and a logical address associated with an i-th logical address range ("i" being a positive integer) that the host device HD allocates to the storage device 100 may be stored or updated in a j-th storage area MAn' ("j" being a positive integer)

When metadata associated with the same address (e.g., a physical address or a logical address) is stored or updated at the same location, it may be easy for the controller 120 to track or analogize a policy for managing the nonvolatile memory device 110. Accordingly, the controller 120 according to an example embodiment may inhibit (or, alternatively, prevent) a management policy of the controller 120 from being tracked or analogized by changing the second address of the second address range to the first address of the first address range by using the remapping unit RU.

In an example embodiment, when the core circuit of the controller 120 updates metadata corresponding to the i-th storage area MAi' of the second address range, the controller 120 may intend to upload the updated metadata, which corresponds to the i-th storage area MAi' of the second address range, to the host memory buffer area HMBA. When the controller 120 uploads the updated metadata corresponding to the i-th storage area MAi' of the second address range to the host memory buffer area HMBA, the remapping unit RU may alternately select a storage area of the first address range corresponding to the i-th storage area MAi' of the second address range from storage areas belonging to the first address range. For example, the term "alternately" may mean that upon updating the metadata corresponding to the i-th storage area MAi', the storage area of the first address range previously associated with the i-th storage area MAi' of the second address range is different from a storage area of the first address range newly associated with the i-th storage area MAi' of the second address range.

According to the above description, when the core circuit of the controller 120 updates the metadata, in the host memory buffer area HMBA, metadata may be represented as being newly written or updated at a different location, not at a storage area in which previous metadata is stored. Accordingly, it may be difficult to track a metadata management policy of the controller 120. This may mean that the security is improved.

In the case where the above-described remapping policy is used, one free storage area in which metadata updated within the first address is to be stored may be necessary in updating metadata of a storage area within the second address range. Accordingly, the number of storage areas of the second address range necessary for the core circuit of the controller 120 may be less than the number of storage areas of the first address range that are allocated in the host memory buffer area HMBA.

In an example embodiment, the first, second, third, and fourth storage areas MA1', MA2', MA3', and MA4' of the second address range may be remapped to the first, fifth, second, and third storage areas MA1, MA5, MA2, and MA3 of the first address range, respectively.

The controller 120 may intend to store metadata including a pattern, in which "00" is repeated, in the first area MA1' of the second address range, store metadata including a pattern, in which "01" is repeated, in the second area MA2' of the second address range, store metadata including a pattern, in which "02" is repeated, in the third area MA3' of the second address range, and store metadata including a pattern, in which "03" is repeated, in the fourth area MA4' of the second address range.

The controller 120 may encrypt metadata by using the encryption circuit ECa of FIG. 4 and may store the encrypted metadata in storage areas of the first address range. For example, in the second address range, metadata stored in the first storage area MA1' may be changed to data of "01, 11, C2, 3F, EE, FF, 1D, 8C" through encryption, and the data of "01, 11, C2, 3F, EE, FF, 1D, 8C" may be stored in the first storage area MA1 of the first address range. In the second address range, metadata stored in the second storage area MA2' may be changed to data of "AA, 3B, 41, 28, 7A, EF, CC, D4" through encryption, and the data of "AA, 3B, 41, 28, 7A, EF, CC, D4" may be stored in the fifth storage area MA5 of the first address range. In the second address range, metadata stored in the third storage area MA3' may be changed to data of "97, FA, BA, 49, 5C, B4, 9D, 77" through encryption, and the data of "97, FA, BA, 49, 5C, B4, 9D, 77" may be stored in the second storage area MA2 of the first address range. In the second address range, metadata stored in the fourth storage area MA4' may be changed to data of "6E, FA, B3, 7C, FC, BB, AF, 00" through encryption, and the data of "6E, FA, B3, 7C, FC, BB, AF, 00" may be stored in the third storage area MA3 of the first address range.

FIG. 7 is a table illustrating seeds that vary in performing encryption by using the encryption circuit ECa of FIG. 4.

Referring to FIGS. 4 and 7, the first scramble unit SCR1 may use a random number RN as a seed. Since the random number RN may be newly generated when the storage device 100 is powered on, for example, when the storage device 100 is booted, the random number RN may vary when the storage device 100 is powered on. For example, the random number RN may not vary, that is, may be fixed in the case where the host memory buffer area HMBA is maintained because the power of the storage device 100 is maintained. Accordingly, data that is scrambled using the random number RN as the seed may be descrambled using the same random number RN as the seed. The controller 120 may change the random number RN when the power of the storage device 100 is interrupted and then supplied or when the computing device 10 exits from the power saving mode and the host memory buffer area HMBA is newly allocated. That is, the seed may be varied. Accordingly, encryption and decryption may be performed normally while the host memory buffer area HMBA is maintained. Furthermore, since the random number RN is varied when the host memory buffer area HMBA is deleted and is again generated, the security of metadata of the storage device 100 may be improved.

The first scramble unit SCR1 may use an address as a part of a seed. A remapped address may vary when the controller 120 performs a write/store operation about the metadata. Accordingly, when the first scramble unit SCR1 uses the remapped address as the seed, the seed may be varied in performing a store/write operation about the metadata.

The second scramble unit SCR2 may use the second signature as the seed. The second signature may be generated by scrambling the signature based on the random number RN and the address. Accordingly, the second signature may be varied when the signature, address, or random number RN is varied. Since the signature is generated from metadata, the signature may be also varied when the metadata is varied. Accordingly, the second signature may be varied when the signature, address, or random number RN is varied.

The scramble may have a simple structure in which XORing of each bit of source data and each bit of the seed is output as resultant data. As such, when bits of specific locations of source data are updated, bits of the same locations of the resultant data may be updated.

Figure 8A:
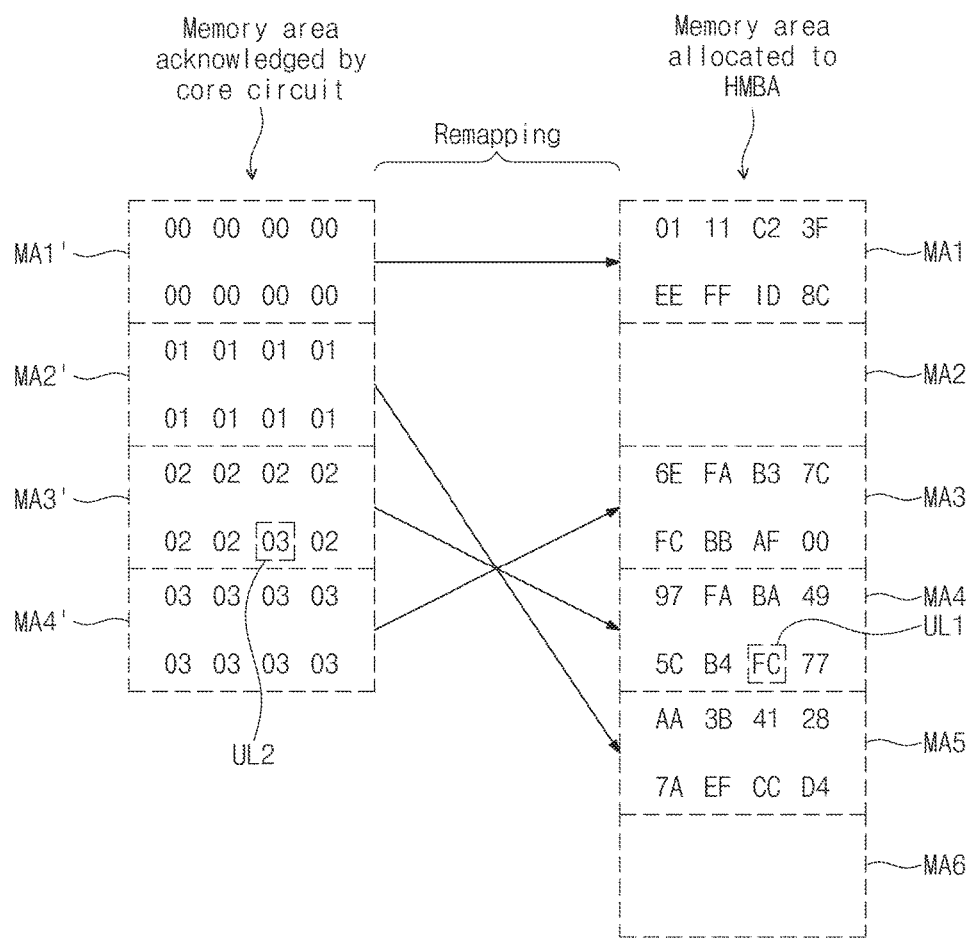
FIGS. 8A and 8B are drawings illustrating an example in which bits of resultant data are updated when bits of source data are updated.
Figure 8B:
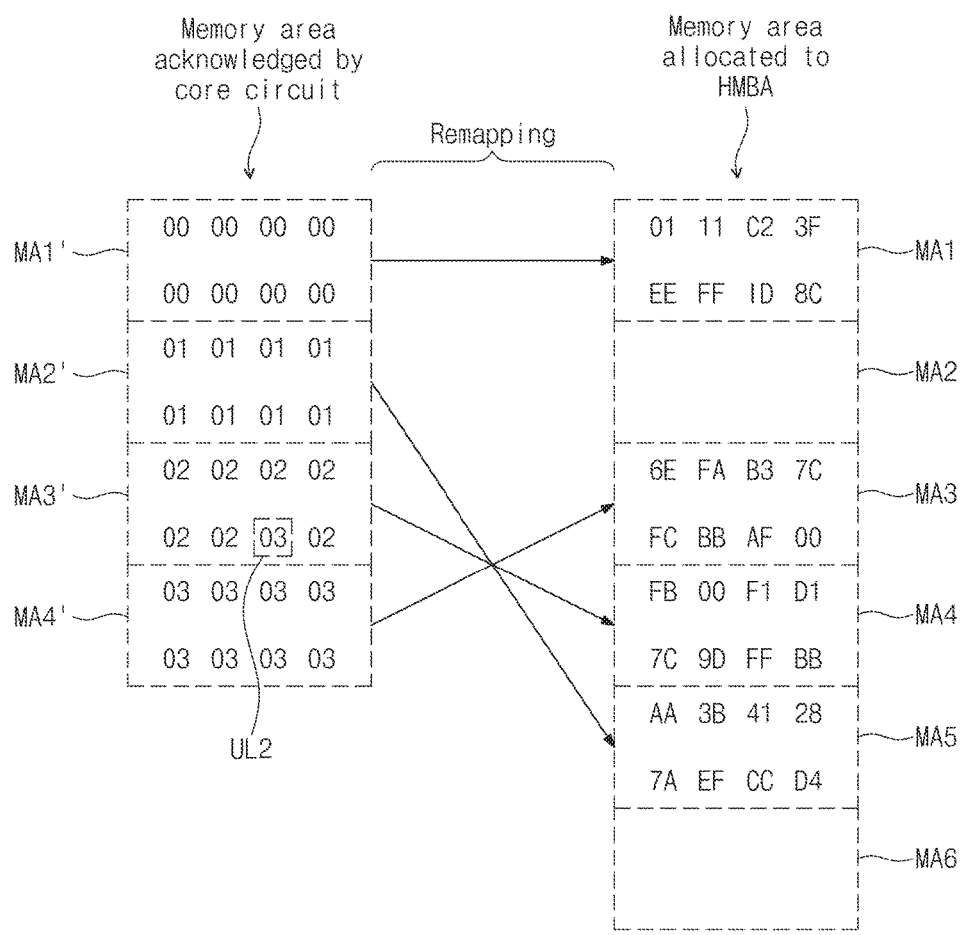

FIGS. 8A and 8B are drawings illustrating an example in which bits of resultant data are updated when bits of source data are updated.

Referring to FIGS. 6 and 8A, compared to FIG. 6, "02" may be updated with "03" at a second update location UL2 of the third storage area MA3' of the second address range. The updated metadata may be encrypted and stored in the host memory buffer area HMBA. During an update operation, the encrypted metadata may be remapped to the fourth storage area MA4 of the first address range. The encrypted metadata may be updated at a first update location UL1 that is the same as the second update location UL2 of the metadata. For example, the encrypted metadata may be updated from "9D" to "FC" at the first update location UL1.

As described with reference to FIGS. 6 and 8A, in the case where a simple scramble structure is applied to the encryption circuit ECa, it may be easy to track the update of the metadata. This may mean that the security of the metadata is lowered.

As illustrated in FIGS. 4 and 7, the encryption circuit ECa according to an example embodiment may perform two or more scrambles while varying seeds when the metadata, address, and random number RN are varied.

Accordingly, as illustrated in FIG. 8B, when the metadata is updated, since encryption is performed to the extent that a pattern between previously encrypted metadata and currently encrypted metadata is not detected, the update of the metadata may not be tracked. For example, as illustrated in FIGS. 6 and 8B, when the metadata is changed from "02, 02, 02, 02, 02, 02, 02" to "02, 02, 02, 02, 02, 02, 03, 02", the encrypted metadata may be changed from "97, FA, BA, 49, 5C, B4, 9D, 77" to "FB, 00, F1, D1, 7C, 9D, FF, BB". As such, it may be difficult to track the update of the metadata. This may mean that the security of the storage device 100 and computing device 10 is improved.

Furthermore, when the metadata is updated, the controller 120 according to an example embodiment may store the encrypted metadata in a new storage area through remapping instead of overwriting the encrypted metadata on previously encrypted metadata. Since a unit by which the controller 120 updates the metadata is not tracked, the security of the storage device 100 and computing device 10 may be improved.

Figure 9:
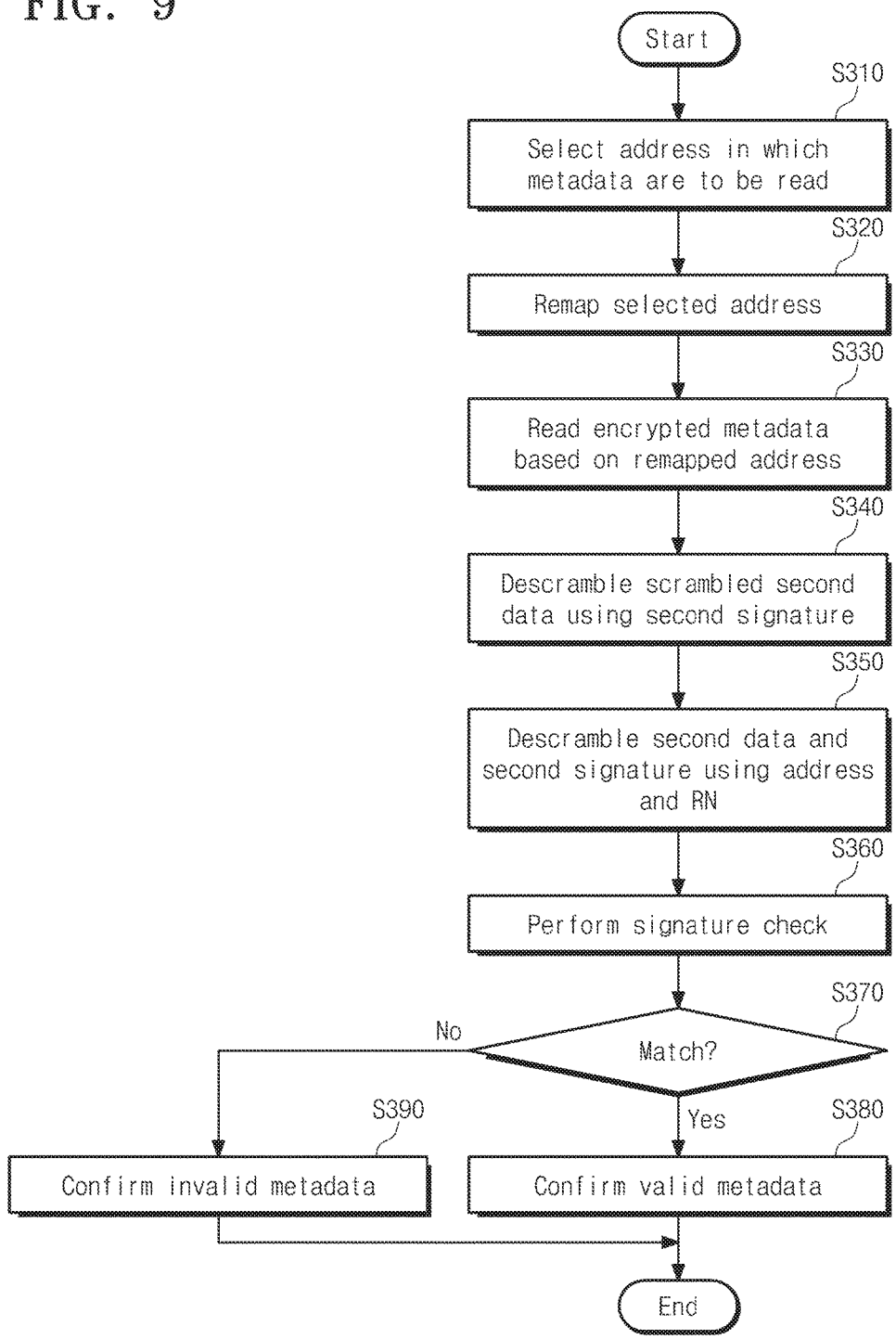
FIG. 9 is a flowchart illustrating a method in which the storage device 100 according to an example embodiment reads metadata from the host memory buffer area of the RAM by using the encryption circuit of FIG. 4.

FIG. 9 is a flowchart illustrating a method in which the storage device 100 according to an example embodiment reads metadata from the host memory buffer area HMBA of the RAM 30 by using the encryption circuit ECa of FIG. 4.

Referring to FIGS. 1, 3, 4, and 9, in operation S310, the controller 120 may select an address of a memory area from which metadata is to be read. For example, the controller 120 may select an address of a memory area, from which metadata is to be read, within an address range of the host memory buffer area HMBA. For example, the core circuit (refer to FIG. 22) of the controller 120 may select an address within the second address range.

In operation S320, the controller 120 (e.g., the remapping unit RU in the controller 120) may remap the selected address. For example, the remapping unit RU may convert the second address selected within the second address range into the first address within the first range. The first address range may be larger than the second address range. For example, the remapping unit RU may convert the second address of the second address range into the first address of the first address range, based on a table, a pattern, or a function. For example, the first address of the first address range may have the same format as the second address of the second address range and may comply with the same address system. As another example, the first address of the first address range may have a format different from that of the second address of the second address range and may be an internal address or virtual address complying with a different address system.

In operation S330, the controller 120 may read the encrypted memory buffer from the host memory buffer area HMBA of the RAM 30 based on the remapped address. The encrypted metadata may include scrambled second data and a second signature SIG2.

In operation S340, the controller 120 (e.g., the second scramble unit SCR2 in the controller 120) may descramble the scrambled second data by using the second signature SIG2 as the seed.

In operation S350, the controller 120 (e.g., the first scramble unit SCR1 in the controller 120) may descramble the second data DAT2 and the second signature SIG2 by using an address and a random number RN as the seed. The address may be the second address of the second address range before remapping or the first address of the first address range after remapping. The random number RN may be a true random number or a pseudo random number. The descrambled second data may be decrypted metadata, and the descrambled second signature may be a decrypted signature.

In operation S360, the controller 120 (e.g., the signature generating and checking unit SGCU in the controller 120) may perform signature check. For example, the signature generating and checking unit SGCU may generate a signature from the decrypted metadata. The signature generating and checking unit SGCU may compare the decrypted signature with the generated signature. In operation S370, whether the decrypted signature is the same as matches) the generated signature may be determined.

In operation S380, the controller 120 may confirm that the decrypted metadata is valid, if the decrypted signature is the same as the generated signature.

Alternatively, in operation S390, the controller 120 may confirm that the decrypted metadata is invalid, if the decrypted signature is different from the generated signature. When the controller 120 confirms that the decrypted metadata is invalid, the controller 120 may, for example, again read the encrypted metadata from the host memory buffer area HMBA or may discard the encrypted metadata from the host memory buffer area HMBA. In some example embodiments, the controller 120 may notify the host device HD that the decrypted metadata is invalid.

Figure 10:
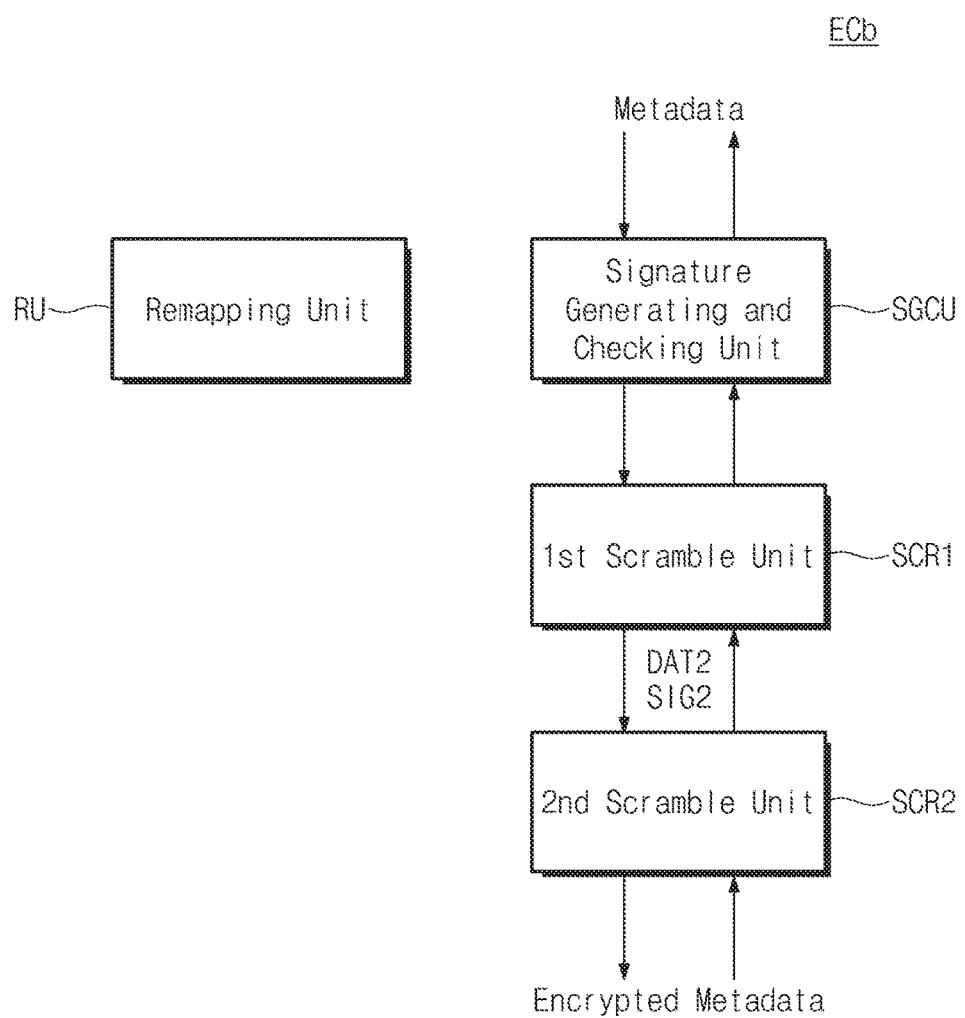
FIGS. 10 to 12 are block diagrams illustrating applications of the encryption circuit of FIG. 4.
Figure 11:
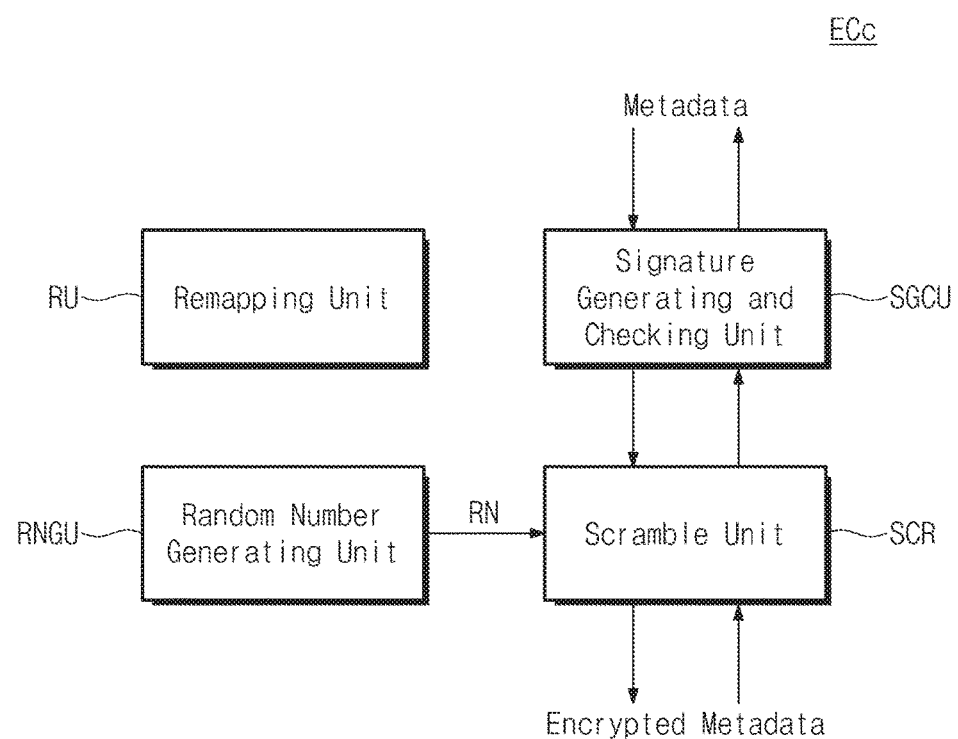
Figure 12:
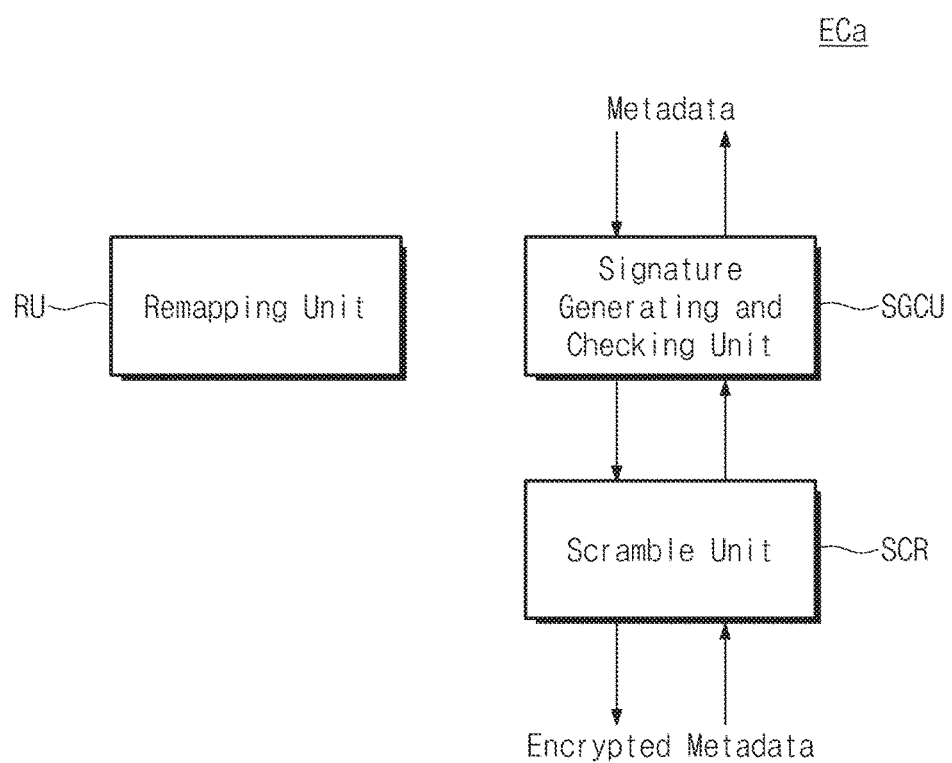

FIGS. 10 to 12 are block diagrams illustrating applications of the encryption circuit ECa of FIG. 4.

Referring to FIGS. 4 and 10 to 12, compared to the encryption circuit ECa of FIG. 4, an encryption circuit ECb of FIG. 10 may not include a random number generating unit RNGU. Compared to the encryption circuit ECa of FIG. 4, an encryption circuit ECc of FIG. 11 may include one scramble unit SCR instead of the first and second scramble units SCR1 and SCR2. Compared to the encryption circuit ECa of FIG. 4, an encryption circuit ECd of FIG. 12 may not include a random number generating unit RNGU. In addition, the encryption circuit ECd may include one scramble unit SCR instead of the first and second scramble units SCR1 and SCR2.

FIG. 13 is a table illustrating an example of seeds used in the first scramble unit SCR1 or the scramble unit SCR of each of the encryption circuits ECa to ECd of FIGS. 10 to 12.

Referring to FIGS. 4 and 10 to 13, according to a first scheme S1, an address (e.g., a remapped address) and a random number RN may be used as a seed. For example, the first scramble unit SCR1 of FIG. 4 or the scramble unit SCR of FIG. 11 may scramble metadata and a signature by using the address (e.g., the remapped address) and the random number RN as the seed. The first scramble unit SCR1 of FIG. 4 or the scramble unit SCR of FIG. 11 may descramble the second data DAT2 and the second signature SIG2 or encrypted metadata read from the host buffer memory area HMBA by using the address (e.g., the remapped address) and the random number RN as the seed.

According to a second scheme S2, the address (e.g., a remapped address) may be used as the seed. For example, the first scramble unit SCR1 of FIG. 10 or the scramble unit SCR of FIG. 12 may scramble metadata and a signature by using the address (e.g., the remapped address) as the seed. The first scramble unit SCR1 of FIG. 10 or the scramble unit SCR of FIG. 12 may descramble the second data DAT2 and the second signature SIG2 or encrypted metadata read from the host buffer memory area HMBA by using the address (e.g., the remapped address) as the seed.

According to a third scheme S3, the signature and the random number RN may be used as the seed. For example, the first scramble unit SCR1 of FIG. 4 or the scramble unit SCR of FIG. 11 may scramble metadata and a signature by using the signature and the random number RN as the seed. The first scramble unit SCR1 of FIG. 4 or the scramble unit SCR of FIG. 11 may descramble the second data DAT2 and the second signature SIG2 or encrypted metadata read from the host buffer memory area HMBA by using the signature and the random number RN as the seed.

According to a fourth scheme S4, the signature may be used as the seed. For example, the first scramble unit SCR1 of FIG. 10 or the scramble unit SCR of FIG. 12 may scramble metadata and a signature by using the signature as the seed. The first scramble unit SCR1 of FIG. 10 or the scramble unit SCR of FIG. 12 may descramble the second data DAT2 and the second signature SIG2 or encrypted metadata read from the host buffer memory area HMBA by using the signature as the seed.

According to a fifth scheme S5, the address (e.g., a remapped address), the signature, and the random number RN may be used as the seed. For example, the first scramble unit SCR1 of FIG. 4 or the scramble unit SCR of FIG. 11 may scramble metadata and a signature by using the address (e.g., the remapped address), the signature, and the random number as the seed. The first scramble unit SCR1 of FIG. 4 or the scramble unit SCR of FIG. 11 may descramble the second data DAT2 and the second signature SIG2 or encrypted metadata read from the host buffer memory area HMBA by using the address the remapped address), the signature, and the random number RN as the seed.

According to a sixth scheme S6, the address (e.g., a remapped address) and the signature may be used as the seed. For example, the first scramble unit SCR1 of FIG. 10 or the scramble unit SCR of FIG. 12 may scramble metadata and a signature by using the address (e.g., the remapped address) and the signature as the seed. The first scramble unit SCR1 of FIG. 10 or the scramble unit SCR of FIG. 12 may descramble the second data DAT2 and the second signature SIG2 or encrypted metadata read from the host buffer memory area HMBA by using the address the remapped address) and the signature as the seed.

Figure 14:
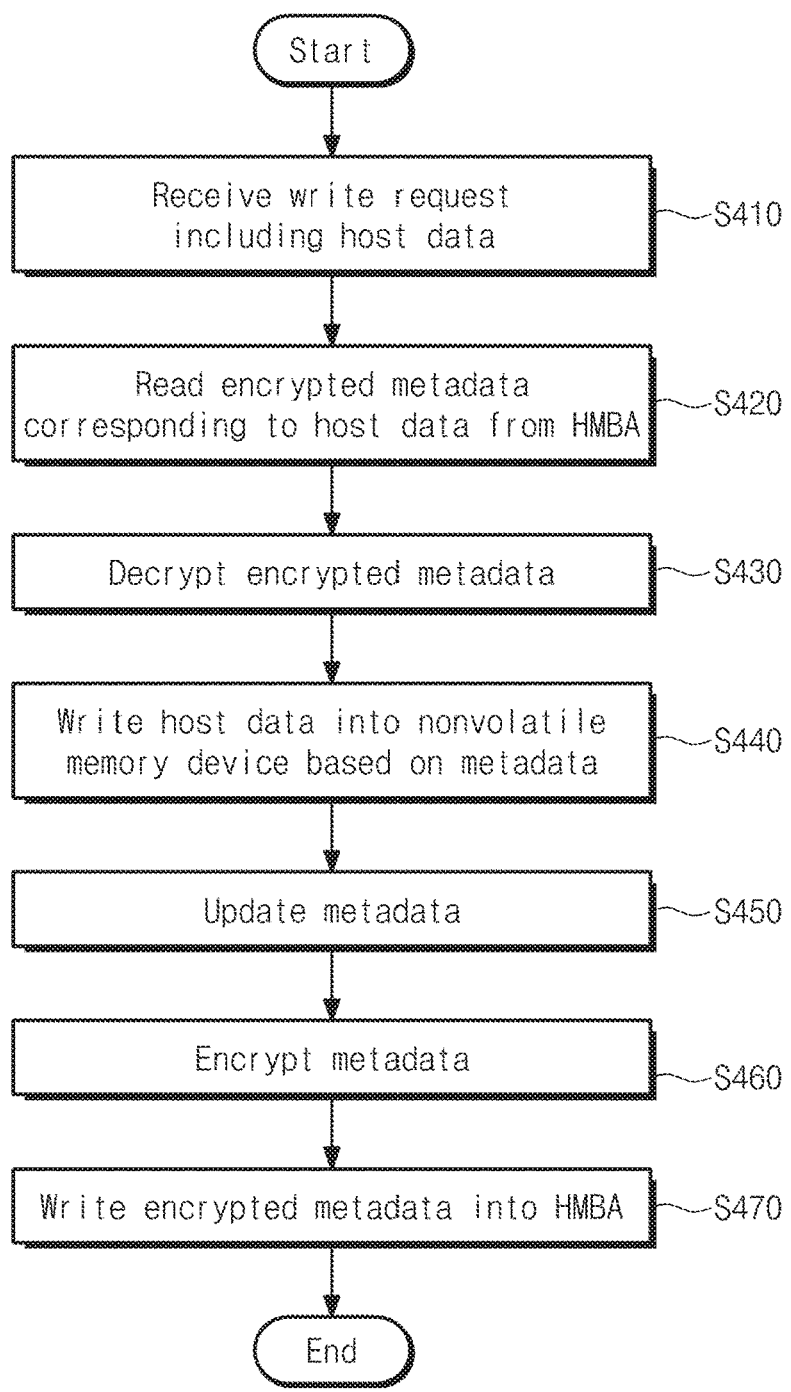
FIG. 14 is a flowchart illustrating a method in which the storage device 100 according to an example embodiment performs a write operation.
Figure 15:
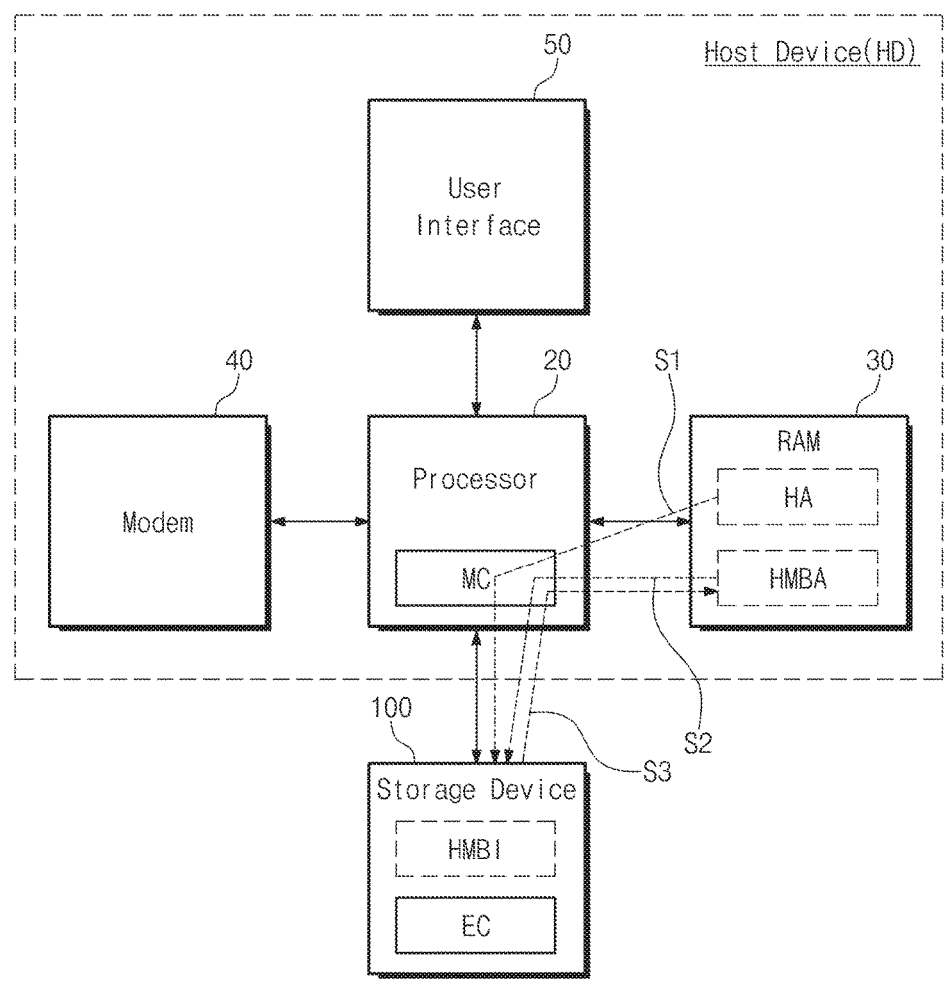
FIG. 15 is a drawing illustrating a process in which a write operation of the storage device 100 is performed at the computing device 10.

FIG. 14 is a flowchart illustrating a method in which the storage device 100 according to an example embodiment performs a write operation. FIG. 15 is a drawing illustrating a process in which a write operation of the storage device 100 is performed at the computing device 10.

Referring to operation S410 of FIG. 14 and a first sequence S1 of FIG. 15, the controller 120 may receive a write request, which includes host data, from the host device HD. The host data may be data to be written by the host device HD in the storage device 100. The host data may be data to be sent to the controller 120 from the host area HA of the RAM 30 in the host device HD.

Referring to operation S420 of FIG. 14 and a second sequence S2 of FIG. 15, the controller 120 may read encrypted metadata from the host memory buffer area HMBA of the RAM 30 in the host device HD. For example, the controller 120 may read the encrypted metadata associated with (or corresponding to) the host data from the host memory buffer area HMBA.

In operation S430, the controller 120 may decrypt the encrypted metadata.

In operation S440, the controller 120 may write the host data in the nonvolatile memory device 110 based on the metadata.

Since the host data is written in the nonvolatile memory device 110, in operation S450, the controller 120 may update the metadata. For example, under control of the controller 120, the metadata may be updated to further include a mapping relation between a physical address of the nonvolatile memory device 110, at which the host data is written, and a logical addresses associated with the write request of the host device HD.

In operation S460, the controller 120 may encrypt the updated metadata.

Referring to operation S470 of FIG. 14 and a third sequence S3 of FIG. 15, the controller 120 may store the encrypted metadata in the host memory buffer area HMBA. For example, the encrypted metadata may be written by the remapping unit RU in a free area of the host memory buffer area HMBA. A previous storage area associated with the encrypted metadata may be released.

Figure 16:
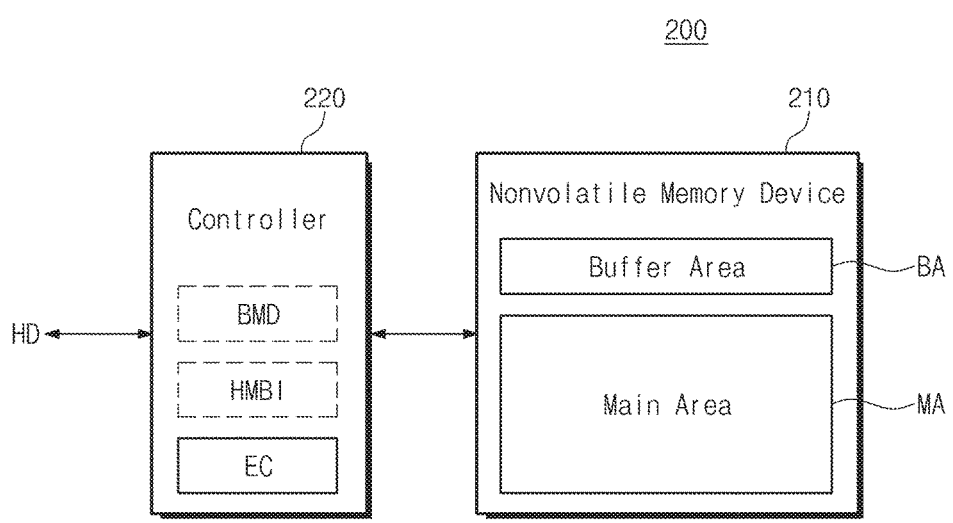
FIG. 16 is a block diagram illustrating a storage device according to an example embodiment of the inventive concepts.

FIG. 16 is a block diagram illustrating a storage device 200 according to an example embodiment of the inventive concepts.

Referring to 16, the storage device 200 may include a nonvolatile memory device 210 and a controller 220. Compared to the nonvolatile memory device 110 of the storage device 100 of FIG. 3, the nonvolatile memory device 210 of the storage device 200 of FIG. 16 may include a main area MA and a buffer area BA. The controller 220 of the storage device 200 may be configured to store and manage buffer metadata BMD.

The main area MA may operate the same as described with reference to the nonvolatile memory device 110 in FIGS. 1 to 15. For example, the controller 220 may load and use metadata for managing the main area MA on the host memory buffer area HMBA of the RAM 30 of the external host device HD.

The buffer area BA may be a storage space that belongs to the nonvolatile memory device 210 and is managed independently of the main area MA. For example, the buffer area BA may be a storage space that is used for the controller 220 to store data temporarily. The main area MA may be a space that the external host device HD identifies and accesses. The buffer area BA may be an area that is not identified by the external host device HD and is accessed by only the controller 220. Each memory cell in the main area MA may store bits of which the number is two or more, and each memory cell of the buffer area BA may store bits of which the number is two or less. The controller 220 may internally manage the buffer metadata BMD for managing the buffer area. BA without loading the buffer area BA on the external host device HD. The buffer metadata BMD may include information on a relation between a logical address, received from the external host device HD, and a physical address of the buffer area BA.

In an example embodiment, when the external host device HD requests a write operation of a first type from the storage device 200, the storage device 200 may perform the write operation with respect to the main area MA of the nonvolatile memory device 210 in the same method as described with reference to FIGS. 14 and 15. When the external host device HD requests a write operation of a second type from the storage device 200, the storage device 200 may perform the write operation with respect to the main area MA and the buffer area BA of the nonvolatile memory device 210 in the same method as described with reference to FIG. 17.

For example, the controller 220 may determine a type of the write request according to a type of a write request from the host device HD, a type of argument given by the host device HD to the write request, or a size of data to be written in the storage device through the write request of the host device HD. For example, the type of the write request may be determined according to whether a size of data write-requested by the host device HD is larger than a reference value. For example, the type of the write request may be determined according to whether the whole of the size of data that is write-requested by the host device HD but is not yet processed by the storage device 200 is larger than the reference value.

Figure 17:
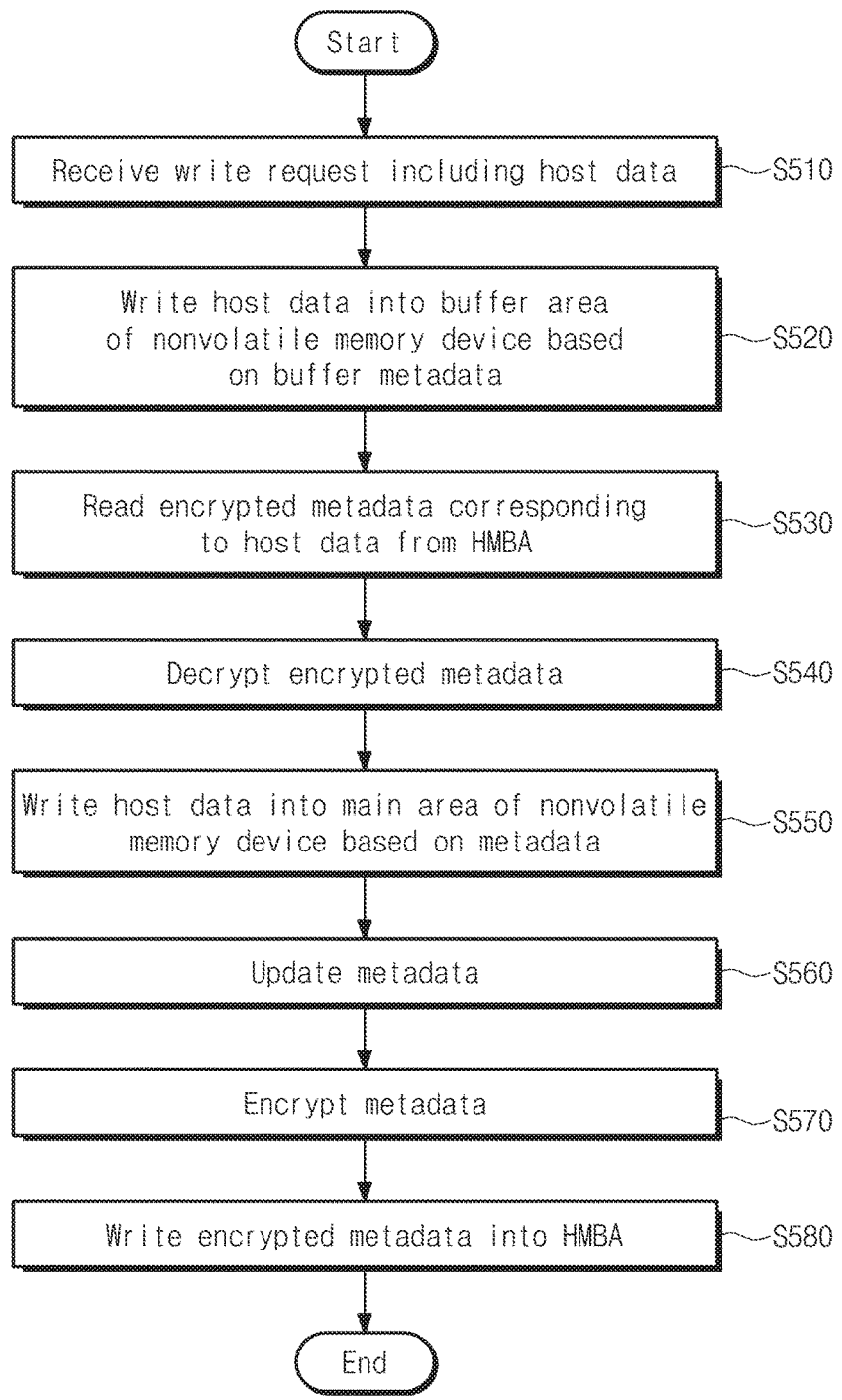
FIG. 17 is a flowchart illustrating a method in which the storage device performs a write operation based on a write request of a second type.

FIG. 17 is a flowchart illustrating a method in which the storage device 200 performs a write operation based on a write request of a second type.

Referring to FIGS. 16 and 17, in operation S510, the storage device 200 may receive a write request including host data from the external host device. The write request may be of a second type that causes a write operation about the main area MA and the buffer area BA.

In operation S520, the controller 220 may write the host data in the nonvolatile memory device 210 based on the buffer metadata BMD managed internally.

In operation S530, the controller 220 may read encrypted memory buffer corresponding to the host data from the host memory buffer area HMBA. In operation S540, the controller 220 may decrypt the encrypted metadata. Operations S530 and S540 may correspond to operations S420 and S430 of FIG. 14, respectively.

In operation S550, the controller 220 may write the host data in the nonvolatile memory device 210 based on the metadata.

In operation S560, the controller 210 may update the metadata. In operation S570, the controller 220 may encrypt the metadata. In operation S580, the controller 220 may store the encrypted metadata in the host memory buffer area HMBA. Operations S560 to S580 may correspond to operations S450 to S470 of FIG. 14, respectively.

To sum up, when the external host device HD sends a write request of the first type to the storage device 100 or 200, the storage device 100 or 200 may write the host data in the nonvolatile memory device 110 or the main area MA as illustrated in FIG. 14. When the external host device HD sends a write request of the second type to the storage device 200, the storage device 200 may write the host data in the main area MA through the buffer area BA as illustrated in FIG. 17. Encrypted metadata that is loaded on the host memory buffer area HMBA may not be accessed in writing the host data in the buffer area BA.

Figure 18:
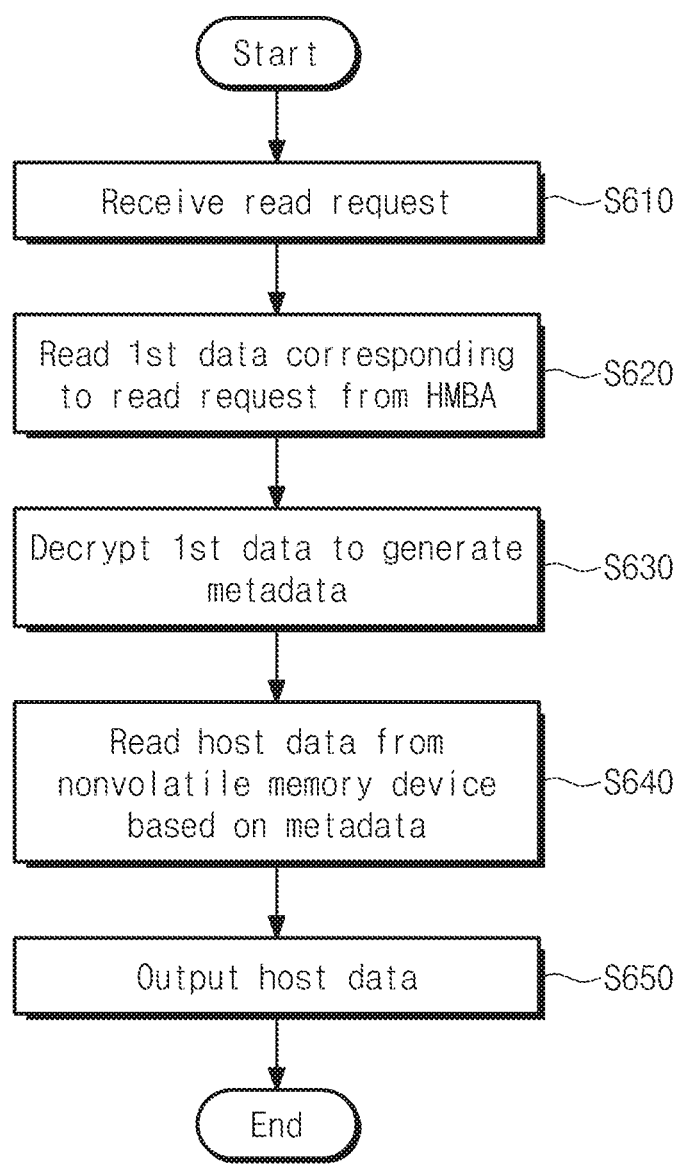
FIG. 18 is a flowchart illustrating a method in which the storage device according to an example embodiment performs a read operation.

FIG. 18 is a flowchart illustrating a method in which the storage device 100 according to an example embodiment performs a read operation.

Figure 19:
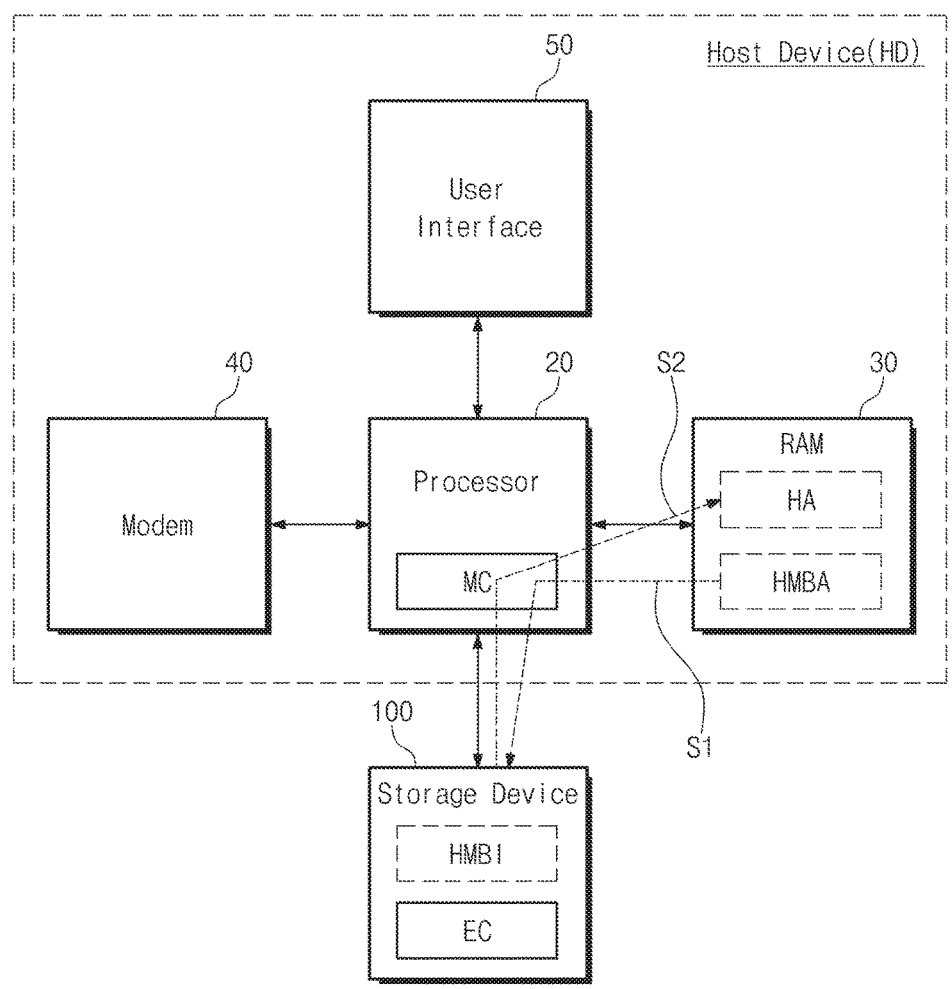
FIG. 19 is a drawing illustrating a process in which a read operation of the storage device 100 is performed at the computing device.

FIG. 19 is a drawing illustrating a process in which a read operation of the storage device 100 is performed at the computing device 10.

Referring to FIGS. 3, 18, and 19, in operation S610, the controller 120 may receive a read request from an external host device HD.

Referring to operation S620 of FIG. 18 and a first sequence S1 of FIG. 19, the controller 120 may read encrypted metadata from the host memory buffer area HMBA of the RAM 30. For example, the controller 120 may read the encrypted metadata associated with (or corresponding to) the host data from the host memory buffer area HMBA.

In operation S630, the controller 120 may decrypt the encrypted metadata. In operation S640, the controller 120 may read the host data from the nonvolatile memory device 110 based on the metadata. The host data may be data read-requested by the host device HD.

Referring to operation S650 of FIG. 18 and a second sequence S2 of FIG. 19, the controller 120 may output the read host data to the host device HD. For example, the controller 120 may store the host data in the host area HA of the RAM 30 in the host device HD.

Figure 20:
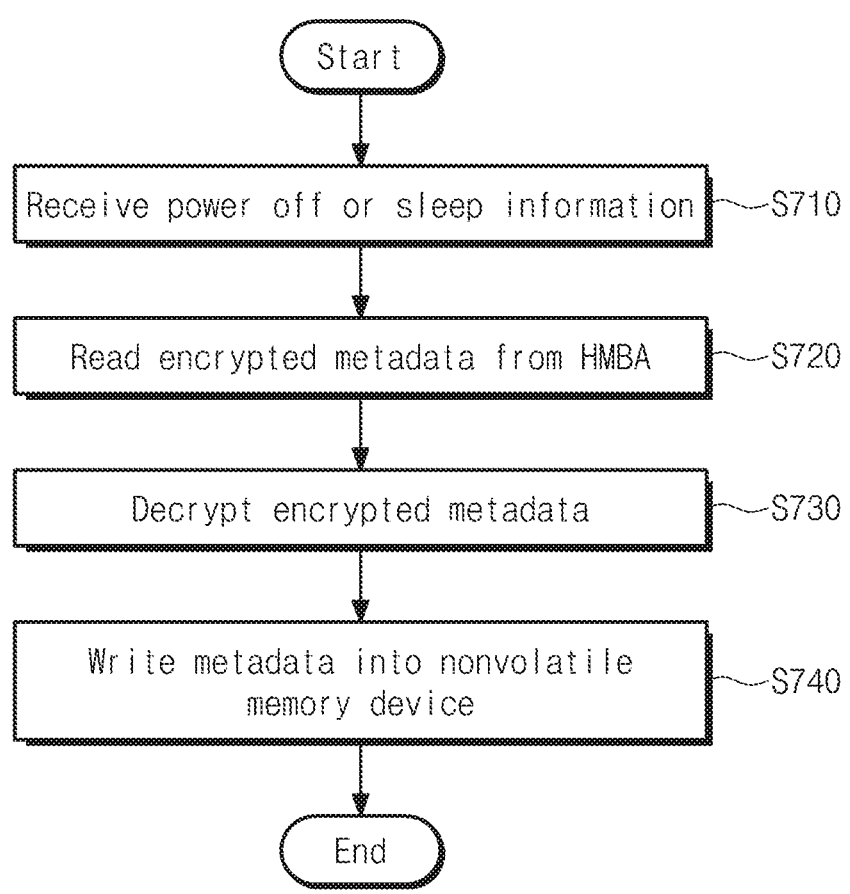
FIG. 20 is a flowchart illustrating an example in which the storage device according to an example embodiment flushes metadata to the nonvolatile memory device.

FIG. 20 is a flowchart illustrating an example in which the storage device 100 according to an example embodiment flushes metadata to the nonvolatile memory device 110.

Referring to FIG. 1, 3 or 16, and 20, in operation S710, the controller 120 may receive power-off or sleep information from the host device HD. The power-off information may be information indicating that the computing device 10 is powered off. The sleep information may be information indicating that the computing device 10 enters a power saving mode.

In operation S720, the controller 120 or 220 may read encrypted memory buffer from the host memory buffer area HMBA of the RAM 30 in the host device HD. In operation S730, the controller 120 may write (or flush) metadata in (or to) the nonvolatile memory device 110 or the main area MA. In an example embodiment, when the host memory buffer area HMBA of the RAM 30 in the host device HD is released, the controller 120 or 220 may flush encrypted data stored in the host memory buffer area HMBA to the nonvolatile memory device 110 or the main area MA.

As another example, when a specific condition is satisfied, the storage device 100 or 200 may flush the encrypted metadata of the host memory buffer area HMBA to the nonvolatile memory device 110 or the main area MA. For example, the storage device 100 or 200 may flush the encrypted metadata of the host memory buffer area HMBA to the nonvolatile memory device 110 or the main area MA periodically, when a voltage is unstable, or when the stability of the RAM 30 is lowered.

After the host memory buffer area HMBA is generated on the RAM 30 as the computing device 10 is powered on or exits from the power saving mode, the storage device 100 or 200 or the computing device 10 may manage metadata on the host memory buffer area HMBA based on a method illustrated in FIGS. 5 and 9 and may process write and read requests about the storage device 100 or 200 based on a method illustrated in FIGS. 16 and 18.

Figure 21:
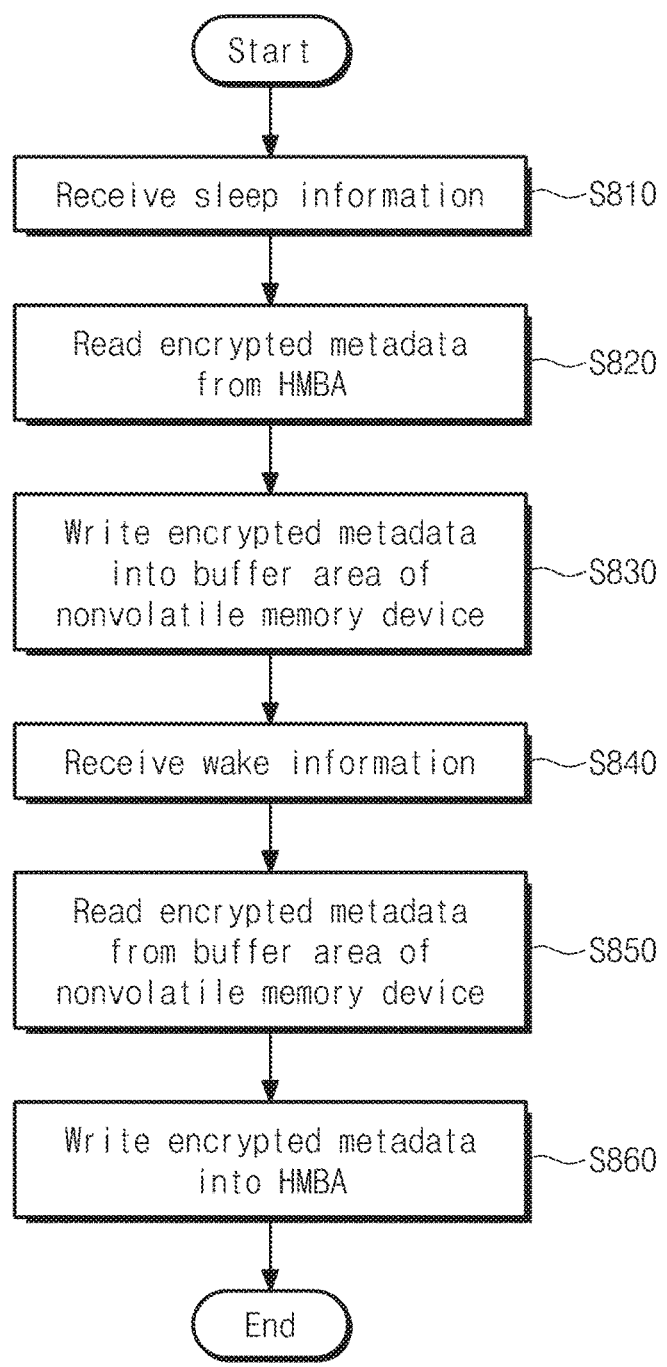
FIG. 21 is a flowchart illustrating a method in which the storage device of FIG. 16 manages metadata based on sleep information.

FIG. 21 is a flowchart illustrating a method in which the storage device 200 of FIG. 16 manages metadata based on sleep information.

Referring to FIGS. 1, 16, and 21, in operation S810, the controller 220 may receive sleep information from the host device HD.

In operation S820, the controller 220 may read encrypted memory buffer from the host memory buffer area HMBA of the RAM 30.

In operation S830, the controller 220 may write the encrypted metadata in the buffer area BA of the nonvolatile memory device 210 without decrypting the encrypted metadata.

In operation S840, the controller 220 may receive wake information from the host device HD. The wake information may indicate that a mode of the storage device 200 or the computing device 10 is switched from a sleep mode to a normal mode.

In operation S850, the controller 220 may read encrypted memory butter the buffer area BA of the nonvolatile memory device 210.

In operation S860, the controller 220 may store the encrypted metadata in the host memory buffer area HMBA of the RAM 30.

As described above, when the storage device 200 or the computing device 10 enters the power saving mode, the storage device 200 may write encrypted metadata stored in the host memory buffer area HMBA in the buffer area BA without separate processing. Afterwards, the host memory buffer area HMBA may be released, and the storage device 200 or the computing device 10 may enter the power saving mode. Since a process in which the controller 220 decrypts the encrypted metadata is omitted, a speed in which the storage device 200 or the computing device 10 enters the power saving mode may be improved.

Likewise, when a mode of the storage device 200 or the computing device 10 is switched to the normal mode, the host memory buffer area HMBA may be allocated. The storage device 200 may store the encrypted metadata stored in the buffer area BA in the host memory buffer area HMBA. Accordingly, continuity of the encrypted metadata stored in the host memory buffer area HMBA may be maintained even at the power saving mode.

In this example embodiment, the random number generating unit RNGU (see FIG. 4) may maintain the random number RN and may not update or change the random number RN for consistency of the encryption and decryption before and after the power saving mode.

Returning to FIG. 3, the nonvolatile memory device 110 may perform read, write and erase operations under control of the controller 120. The nonvolatile memory device 110 may receive a command and an address from the controller 120 through an input/output channel. The nonvolatile memory device 110 may exchange data with the controller 120 through the input/output channel.

The nonvolatile memory device 110 may exchange a control signal with the controller 120 through a control channel. For example, the nonvolatile memory device 110 may receive, from the controller 120, at least one of a chip enable signal (/CE) for selecting at least one of a plurality of nonvolatile memory chips in the nonvolatile memory device 110, a command latch enable signal (CLE) indicating that a signal received from the controller 120 through the input/output channel is the command, an address latch enable signal (ALE) indicating that a signal received from the controller 120 through the input/output channel is an address, a read enable signal (/RE) generated by the controller 120 at a read operation, periodically toggled, and used to tune timing, a write enable signal (/WE) activated by the controller 120 when the command or the address is transmitted, a write protection signal (/WP) activated by the controller 120 to prevent unintended writing or erasing when a power changes, and a data strobe signal (DQS) used to adjust input synchronization about the data transmitted through the input/output channel and generated from the controller 120 at a write operation so as to be periodically toggled.

For example, the nonvolatile memory device 110 may output, to the controller 120, at least one of a ready/busy signal (R/nB) indicating whether the nonvolatile memory device 110 is performing a program, erase or read operation and a data strobe signal (DQS) used to adjust output synchronization about the data and generated from the read enable signal (RE) by the nonvolatile memory device 110 so as to be periodically toggled.

The nonvolatile memory device 110 may include a flash memory. However, example embodiments of the inventive concepts may not be limited thereto. For example, the nonvolatile memory device 110 may incorporate at least one of nonvolatile memory devices, such as a phase-change RAM (PRAM), a magnetic RAM (MRAM), a resistive RAM (RRAM), and a ferroelectric RAM (FeRAM).

The memory controller 120 may be configured to access the nonvolatile memory device 110. For example, the controller 120 may control the nonvolatile memory device 110 through the input/output channel and the control channel so as to perform a write, read or erase operation.

The controller 120 may control the nonvolatile memory device 110 in response to control of an external host device (not illustrated). For example, the controller 120 may communicate with the external host device based on the format different from the format for communications with the nonvolatile memory device 110. A unit of data which the controller 120 conveys to the nonvolatile memory device 110 may be different from a unit of data which the controller 120 conveys to the external host device.

The nonvolatile memory device 110 may include a plurality of nonvolatile memory chips. In an example embodiment, the controller 120 and the nonvolatile memory chips may be interconnected based on a channel and a way. One channel may include one data channel and one control channel. One data channel may include eight data lines. One control channel may include control lines for transmitting the chip enable signal (/CE), the command latch enable signal (CLE), the address latch enable signal (ALE), the read enable signal (/RE), the mite enable signal (/WE), the write protect signal (/WP), and the ready/busy signal (R/nB).

Nonvolatile memory chips connected to one channel may constitute a way. "n" nonvolatile memory chips that are connected to one channel may constitute an n-way. Nonvolatile memory chips that belong to one way may share data lines and the control lines for transmitting the command latch enable signal (CLE), the address latch enable signal (ALE), the read enable signal /RE, the write enable signal (/WE), and the write protect signal (/WP). Each of nonvolatile memory chips belonging to one way may communicate with the controller 120 through control lines dedicated to the chip enable signal (/CE) and the ready/busy signal (R/nB).

The controller 120 may alternately access n-way nonvolatile memory chips connected to one channel. The controller 120 may independently access nonvolatile memory chips connected with different channels. The controller 120 may alternately or simultaneously access nonvolatile memory chips connected with different channels.

In an example embodiment, nonvolatile memory chips may be connected with the controller 120 in the form of a wide IO. For example, nonvolatile memory chips connected to different channels may share a control line for the chip enable signal (/CE), Nonvolatile memory chips which share the control line for the chip enable signal (/CE) may be accessed at the same time. Since data lines of different channels are used at the same time, a wide input/output bandwidth may be achieved.

The storage device 100 may include a solid state drive (SSD) or a hard disk drive (HDD). The storage device 100 may include memory cards, such as PC card (personal computer memory card international association (PCM-CIA)), compact flash (CF) card, smart media card (e.g., SM, SMC), memory stick, multimedia card (e.g., MMC, RS-MMC, MMCmicro), SD card (e.g., SD, miniSD, microSD, SDHC), universal serial bus (USB) memory card, and universal flash storage (UFS). The storage device 100 may include embedded memories, such as embedded MultiMedia card (eMMC), UFS, and PPN (Perfect Page NAND).

In an example embodiment, the storage device 100 may further include a controller RAM (not shown) that is controlled by the controller 120. The controller 120 may use the controller RAM as a buffer memory, a cache memory, and a working memory. The controller 120 may store data or code, which is needed to manage the nonvolatile memory device 110, in the controller RAM. For example, the controller 120 may read data or code, which is needed to manage the nonvolatile memory device 110, from the nonvolatile memory device 110 and may load the read data or code on the controller RAM for driving. The controller RAM may include at least one of a variety of random access memories, such as a static RAM (SRAM), a dynamic RAM (DRAM), a synchronous DRAM (SRAM), a phase-change RAM (PRAM), a magnetic RAM (MRAM), a resistive RAM (RRAM), and a ferroelectric RAM (FRAM).

Figure 22:
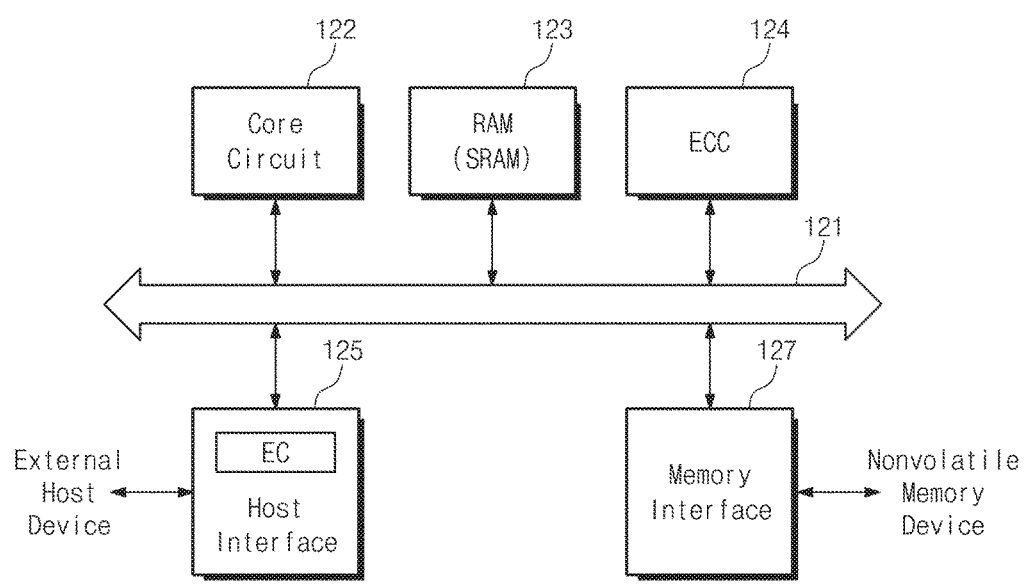
FIG. 22 is a block diagram illustrating the controller according to an example embodiment of the inventive concepts.

FIG. 22 is a block diagram illustrating the controller 120 according to an example embodiment of the inventive concepts.

Referring to FIGS. 3 and 22, the controller 120 may include a bus 121, a core circuit 122, a RAM 123, an ECC block 124, a host interface 125, a memory interface 127, and an encryption circuit EC.

The bus 121 may be configured to provide a channel among elements of the controller 120.

The core circuit 122 may control an overall operation of the controller 120 and may execute a logical operation. The core circuit 122 may communicate with an external host device through the host interface 125 and may communicate with the nonvolatile memory device 110 through the memory interface 127. The core circuit 122 may control the storage device 100 by using the RAM 123 as a working memory, a cache memory, or a buffer memory.

The RAM 123 may be used as a working memory, a cache memory, or a buffer memory of the core circuit 122. The RAM 123 may store code or commands that the core circuit 122 will execute. The RAM 123 may store data processed by the core circuit 122. The RAM 123 may include a static RAM (SRAM).

The error correction (ECC) block 124 may perform an error correction operation. The ECC block 124 may perform error correction encoding based on data to be written at the nonvolatile memory device 110 through the memory interface 127. The error correction encoded data may be sent to the nonvolatile memory device 110 through the memory interface 127. The ECC block 124 may perform error correction decoding with respect to data received through the memory interface 127 from the nonvolatile memory device 110. In an example embodiment, the ECC block 124 may be included in the memory interface 127 as a component of the memory interface 127.

The host interface 125 may communicate with the external host device under control of the core circuit 122. The host interface 125 may convey communications using at least one of various communication manners, such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The host interface 125 may include the encryption circuit EC. The encryption circuit EC may include at least one of the encryption circuits ECa to ECd described with reference to FIGS. 4 and 10 to 12.

The memory interface 127 may communicate with the nonvolatile memory device 110 in response to control of the core circuit 122. As described with reference to FIG. 1, the memory interface 127 may convey a command, an address, and data to the nonvolatile memory device 110 through the input/output channel. The memory interface 127 may convey a control signal to the nonvolatile memory device 110 through the control channel.

In an example embodiment, the core circuit 122 may control the controller 120 based on code. The core circuit 122 may load code from a nonvolatile memory (e.g., a read only memory) that is implemented in the controller 120. As another example, the core circuit 122 may load code from the nonvolatile memory device 110 through the memory interface 127.

In an example embodiment, the bus 121 of the controller 120 may be divided into a control bus and a data bus. The data bus may transfer data in the controller 120, and the control bus may transfer the following control information in the controller 120: a command and an address. The data bus and the control bus may be independent of each other to prevent mutual interference or influence. The data bus may be connected with the ECC block 124, the host interface 125, and the memory interface 127. The control bus may be connected with the core circuit 122, the RAM 123, the host interface 125, and the memory interface 127.

Figure 23:
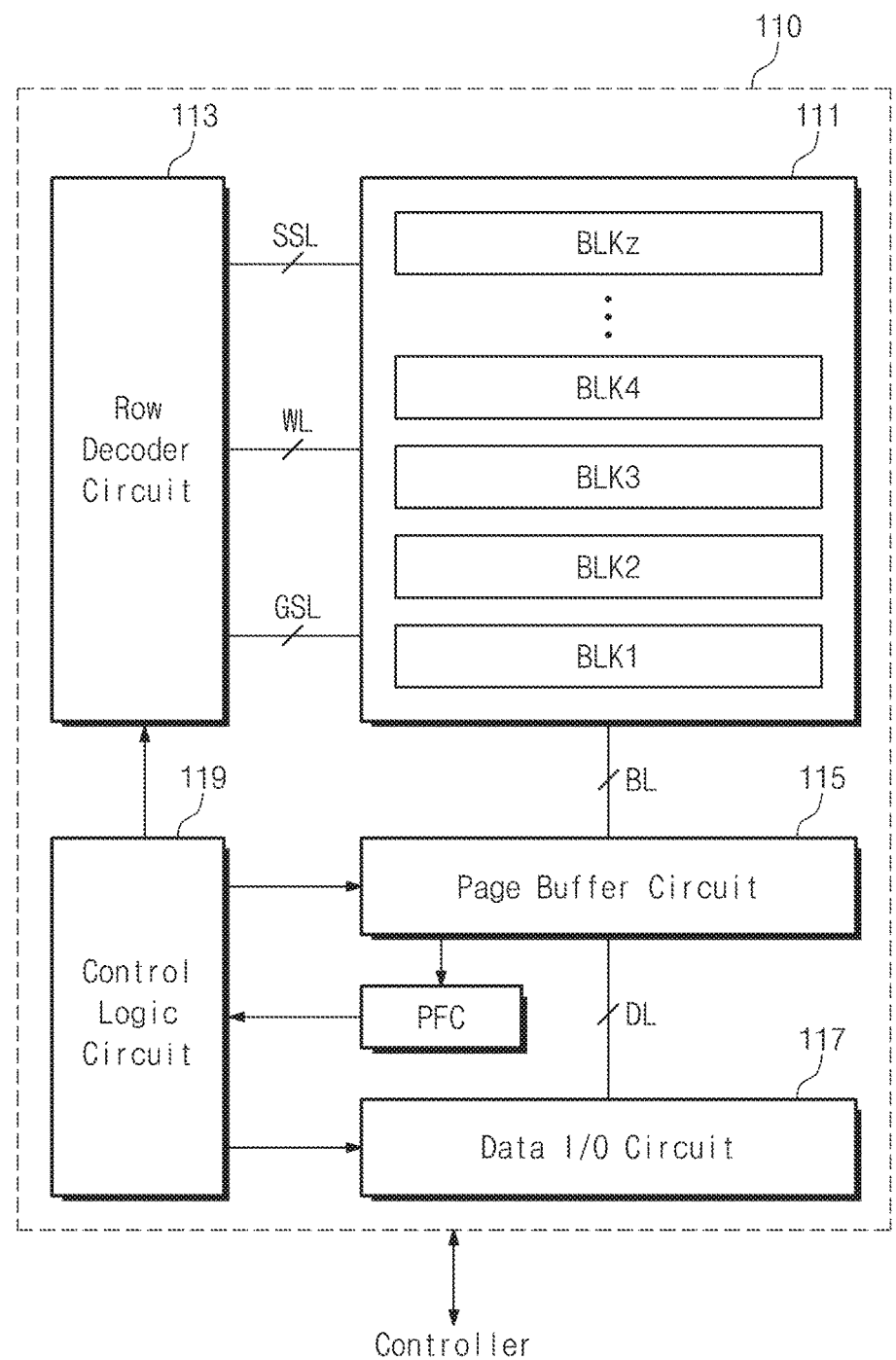
FIG. 23 is a block diagram illustrating e nonvolatile memory according to an example embodiment of the inventive concepts.

FIG. 23 is a block diagram illustrating the nonvolatile memory 110 according to an example embodiment of the inventive concepts.

Referring to FIGS. 3 and 23, the nonvolatile memory device 110 may include a memory cell array 111, a row decoder circuit 113, a page buffer circuit 115, a pass-fail check circuit PFC, a data input/output circuit 117, and a control logic circuit 119.

The memory cell array 111 may include a plurality of memory cells BLK1 to BLKz. Each of the memory blocks BLK1 to BLKz may include a plurality of memory cells. Each of the memory blocks BLK1 to BLKz may be connected to the row decoder circuit 113 through at least one string selection line SSL, a plurality of word lines WL, and at least one ground selection line GSL. Each of the memory blocks BLK1 to BLKz may be connected to the page buffer circuit 115 through a plurality of bit lines BL. The memory blocks BLK1 to BLKz may be connected in common to the plurality of bit lines BL. Memory cells in the memory blocks BLK1 to BLKz may have the same structures.

The row decoder circuit 113 may be connected to the memory cell array 111 through a plurality of ground selection lines GSL, the plurality of word lines WL, and a plurality of string selection lines SSL. The row decoder circuit 113 may operate according to control of the control logic circuit 119. The row decoder circuit 113 may decode an address received from the controller 120 through an input/output channel and may allow voltages to be applied to the string selection lines SSL, the word lines WL, and the ground selection lines GSL based on the decoded address.

The page buffer circuit 115 may be connected to the memory cell array 111 through the bit lines BL. The page buffer circuit 115 may be connected to the data input output circuit 117 through a plurality of data lines DL. The page buffer circuit 115 may operate under control of the control logic circuit 119.

The pass-fail check circuit PFC may check pass and fail of a program operation or an erase operation The data input/output circuit 117 may be connected to the page buffer circuit 115 through the data lines DL. The data input/output circuit 117 may output data, which is read by the page buffer circuit 115, to the controller 120 through the input/output channel and may provide data, which is received from the controller 120 through the input/output channel, to the page buffer circuit 115.

The control logic circuit 119 may receive a command from the controller 120 through the input/output channel and may receive a control signal therefrom through a control channel. The control logic circuit 119 may receive a command, which is provided through the input/output channel, in response to the control signal, may route an address, which is provided through the input/output channel, to the row decoder circuit 113, and may route data, which is provided through the input/output channel, to the data input/output circuit 117. The control logic circuit 119 may decode the received command and may control the nonvolatile memory device 110 based on the decoded command.

FIG. 24 is a circuit diagram illustrating a memory block BLKa according to an example embodiment of the inventive concepts.

Referring to FIG. 24, a memory block BLKa may include a plurality of cell strings CS11 to CS21 and CS12 to CS22. The plurality of cell strings CS11 to CS21 and CS12 to CS22 may be arranged along a row direction and a column direction to constitute rows and columns.

Each cell string may contain a plurality of cell transistors. The cell transistors array include ground selection transistors GST, memory cells MC1 to MC6, and string selection transistors SSTa and SSTb. The ground selection transistor GST, memory cells MC1 to MC6, and string selection transistors SSTa and SSTb in each cell string may be stacked in a height direction perpendicular to a plane (e.g., a plane on a substrate of the memory block BLKa) on which the cell strings CS11 to CS21 and CS12 to CS22 are arranged along the rows and the columns.

Sources of the lowermost ground selection transistors GST may be connected in common to a common source line CSL.

Control gates of ground selection transistors GSTa of the cell strings CS11 and CS12 in a first row may be connected in common to a ground selection line GSL1, and control gates of ground selection transistors GSTb of the cell strings CS21 and CS22 in a second row may be connected in common to a ground selection line GSL2. That is, cell strings in different rows may be connected to different ground selection lines.

Connected in common to a word line are control gates of memory cells that are placed at the same height (or higher) from the substrate (or the ground selection transistors GST). Connected to different word lines WL1 to WL6 are control gates of memory cells that are placed at different heights (or, orders). For example, memory cells MC1 may be connected in common to a word line WL1. Memory cells MC2 may be connected in common to a word line WL2. Memory cells MC3 may be connected in common to a word line WL3. Memory cells MC4 may be connected in common to a word line WL4. Memory cells MC5 may be connected in common to a word line WL5. Memory cells MC6 may be connected in common to a word line WL6.

In the first string selection transistors SSTa of the cell strings CS11 to CS21 and CS12 to CS22 which have the same height (or order), control gates of the first string selection transistors SSTa in different rows may be connected to different string selection lines SSL1a and SSL2a. For example, the first string selection transistors SSTa of the cell strings CS11 and CS12 may be connected in common to the string selection line SSL1a. The first string selection transistors SSTa of the cell strings CS21 and CS22 may be connected in common to the string selection line SSL2a.

In the second string selection transistors SSTb of the cell strings CS11 to CS21 and CS12 to CS22 which have the same height (or order), control gates of the second string selection transistors SSTb in different rows may be connected to different string selection lines SSL1b and SSL2b. For example, the second string selection transistors SSTb of the cell strings CS11 and CS12 may be connected in common to the string selection line SSL1b. The second string selection transistors SSTb of the cell strings CS21 and CS22 may be connected in common to the string selection line SSL2b.

Columns of the cell strings CS11 to CS21 and CS12 to CS22 may be connected to different bit lines BL1 and BL2. For example, the string selection transistors SSTb of the cell strings CS11 and CS21 in the first column may be connected in common to the bit line BL1. The string selection transistors SSTb of the cell strings CS12 and CS22 may be connected in common to the bit line BL2.

According to an example embodiment of the inventive concepts, the 3-dimensional memory array may have a vertical-directional characteristic, and may include vertical NAND strings in which at least one memory cell is located on another memory cell. The at least one memory cell MC may comprise a charge trap layer. Each vertical NAND string may further include at least one selection transistor placed over the memory cells MC. The at least one selection transistor may have the same structure as the memory cells MC and may be formed uniformly with the memory cells MC.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

While example embodiments of the inventive concepts have been described with reference to some example embodiments, it will be apparent to those skilled in the art that various changes and modifications may be made without departing from the spirit and scope of the inventive concepts. Therefore, it should be understood that the above example embodiments are not limiting, but illustrative.

What is claimed is:

1. A storage device, comprising:
   a nonvolatile memory device; and
   a controller configured to,
      control the nonvolatile memory device based on metadata,
      send an information indicating a capacity to an external host device,
      receive an address range of a random access memory of the external host device, the address range corresponding to the capacity,
      encrypt the metadata to generate encrypted metadata, and
      load the encrypted metadata on the address range of the random access memory of an external host device.

2. The storage device of claim 1, wherein the controller is configured to encrypt the metadata by scrambling the metadata based on a seed.

3. The storage device of claim 1, wherein the controller is configured to,
   manage the metadata in units of blocks, and
   encrypt each of the blocks such that all bits in each of the blocks are varied when any bit in each block are modified.

4. The storage device of claim 1, wherein the controller is configured to,
   manage the metadata in units of blocks, and
   write each of the blocks of the metadata in alternate ones of the blocks allocated at the random access memory.

5. The storage device of claim 4, wherein the controller is configured to change each block of the random access memory storing the encrypted metadata, if any of the blocks of the metadata are updated.

6. The storage device of claim 1, wherein the controller is configured to,
   generate a signature from the metadata and encrypt the signature, and
   store the encrypted signature in the random access memory together with the encrypted metadata.

7. The storage device of claim 6, wherein the controller is configured to,
   read the encrypted metadata and the encrypted signature from the random access memory,
   decrypt the encrypted metadata and the encrypted signature,
   generate a second signature from the decrypted metadata, and
   notify the external host device that the decrypted metadata is invalid, if the second signature is different from the decrypted signature.

8. The storage device of claim 1, wherein a size of the encrypted metadata is less than a capacity of the random access memory allocated to store the encrypted metadata.

9. The storage device of claim 1, wherein the controller is configured to,
   encrypt the metadata based on a random number, the random number being updated when the storage device is booted.

10. The storage device of claim 1, wherein the controller is configured to control the nonvolatile memory device based on the encrypted metadata that is loaded on the random access memory.

11. The storage device of claim 1, wherein in response to a write request of a first type, the controller is configured to,
   receive first write data from the random access memory,
   read, from the random access memory, an encrypted version of first partial metadata, the first partial metadata being a portion of the encrypted metadata associated with the first write data,
   decrypt the encrypted version of the first partial metadata to generate a decrypted version of the first partial metadata, and
   write the first write data in the nonvolatile memory device based on the decrypted version of the first partial metadata.

12. The storage device of claim 11, wherein in response to a write request of a second type, the controller is configured to,
   receive second write data from the random access memory, write the second write data in a buffer area of the nonvolatile memory device, read, from the random access memory, an encrypted version of second partial metadata, the second partial metadata being a portion of the encrypted metadata associated with the second write data, decrypt the encrypted version of second partial metadata to generate a decrypted version of the second partial metadata, and write the decrypted version of the second write data in a main area of the nonvolatile memory device based on the second partial metadata.

13. The storage device of claim 12, wherein the controller is configured to, control the main area of the nonvolatile memory device based on the metadata, and manage the buffer area of the nonvolatile memory device based on second metadata internally managed.

14. The storage device of claim 11, wherein the controller is configured to, generate second partial metadata by updating the first partial metadata, encrypt the second partial metadata to generate an encrypted version of the second partial metadata, and store the encrypted version of the second partial metadata in the random access memory.

15. The storage device of claim 1, wherein the controller is configured to, receive a read request from the external host device, read, from the random access memory, an encrypted version of partial metadata, the partial metadata being a portion of the encrypted metadata associated with the read request, decrypt the encrypted partial metadata to generate a decrypted version of the partial metadata, read data from the nonvolatile memory device based on the decrypted version of the partial metadata, and write the read data in the random access memory.

16. The storage device of claim 1, wherein the controller is configured to, receive power-off or sleep information from the external host device, read the encrypted metadata from the random access memory, decrypt the encrypted metadata to generate decrypted metadata, and write the decrypted metadata in the nonvolatile memory device.

17. The storage device of claim 1, wherein the controller is configured to, receive sleep information from the external host device, read the encrypted metadata from the random access memory, and write the encrypted metadata in the nonvolatile memory device.

18. The storage device of claim 17, wherein the controller is configured to, receive wake information from the external host device, read the encrypted metadata from the nonvolatile memory device, and load the encrypted metadata on the random access memory.

19. A storage device, comprising:

a nonvolatile memory device including a plurality of cell strings, the plurality of cell strings including a plurality of memory cells stacked in a direction perpendicular to a substrate; and a controller configured to, control the nonvolatile memory device based on metadata, manage the metadata in units of blocks, read the metadata from the nonvolatile memory device, encrypt each block of the blocks of the metadata to generate encrypted metadata such that more bits than at least one bit in each block of the blocks are varied when at least one bit in each block is modified, and load the encrypted metadata on a random access memory of an external host device.

20. A storage device, comprising:

a memory and a processor, the memory containing computer readable code that, when executed by the processor, configures the processor to perform an operation on data associated with storage device by, encrypting metadata and loading the encrypted metadata into a host buffer memory area (HBMA) of a host device, in response to updating the metadata, reading the encrypted metadata from the host buffer memory area of the host device, decrypting the encrypted metadata to generate decrypted metadata, mapping logical addresses received from the host device to physical addresses of the storage device based on the decrypted metadata, and performing the operation on the data based on the physical addresses, wherein when loading the encrypted metadata, the processor is configured to change a location of the host buffer memory area in which the encrypted metadata are loaded in response to updating the metadata.

* * * * *